(12) United States Patent
Taniguchi et al.

(10) Patent No.: US 6,562,264 B1
(45) Date of Patent: May 13, 2003

(54) METHOD OF CONTROLLING A COMPRESSION INJECTION MOLDING MACHINE

(75) Inventors: Yoshiya Taniguchi, Akashi (JP); Nobuyuki Hirayama, Tokyo (JP); Yoshiaki Hara, Tokyo (JP)

(73) Assignees: Toyo Machinery & Metal Co., Ltd., Akashi (JP); Sony Disc Technology Inc., Tokyo (JP)

( * ) Notice: Subject to any disclaimer, the term of this patent is extended or adjusted under 35 U.S.C. 154(b) by 111 days.

(21) Appl. No.: 09/657,464

(22) Filed: Sep. 7, 2000

Related U.S. Application Data

(62) Division of application No. 09/110,130, filed on Jul. 6, 1998, now Pat. No. 6,183,235.

(30) Foreign Application Priority Data

| Jul. 7, 1997 | (JP) | 9-197825 |
| Dec. 15, 1997 | (JP) | 9-363684 |
| Dec. 26, 1997 | (JP) | 9-369418 |
| May 6, 1998 | (JP) | 10-140614 |

(51) Int. Cl.$^7$ .............................................. B29C 45/77
(52) U.S. Cl. ..................... 264/40.4; 264/40.5; 264/154; 264/328.7
(58) Field of Search ................................ 264/40.1, 40.4, 264/40.5, 328.1, 328.7, 154, 161; 425/139, 145, 146, 147, 149, 150

(56) References Cited

U.S. PATENT DOCUMENTS

| 4,878,824 A | | 11/1989 | Hara |
| 4,900,242 A | * | 2/1990 | Maus et al. ............... 264/328.7 |
| 5,639,486 A | | 6/1997 | Yamaguchi |
| 5,906,777 A | | 5/1999 | Kamiguchi et al. |
| 5,912,025 A | | 6/1999 | Hiraoka |

* cited by examiner

Primary Examiner—Jill L. Heitbrink
(74) Attorney, Agent, or Firm—Oblon, Spivak, McClelland, Maier & Neustadt, P.C.

(57) ABSTRACT

A method of controlling a compression injection molding machine having a movable die mounted on a movable die plate including using a pressure sensor to detect a reaction force produced at the movable die by resin being injected into a die cavity. The pressure sensor is positioned between the movable die plate and a housing supporting a toggle driving mechanism that moves the movable die plate and movable die. The output of the sensor is applied to control the injection of the resin into the die cavity or the thickness of the resin. This output can also control gate cutting or resin injection speed.

1 Claim, 21 Drawing Sheets

Fig. 18 (1)
Die closing
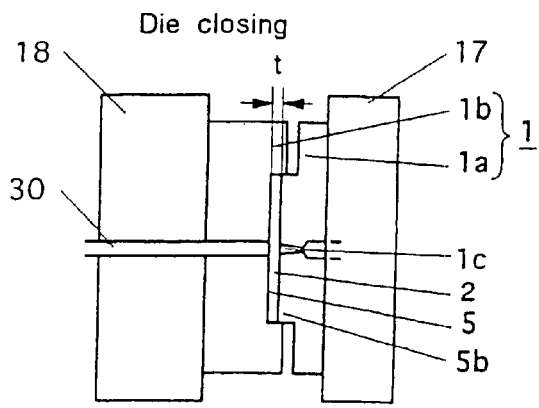
Fig. 18 (2)
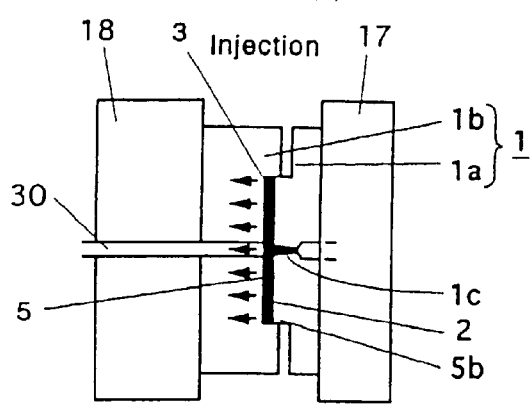
Fig. 18 (3)
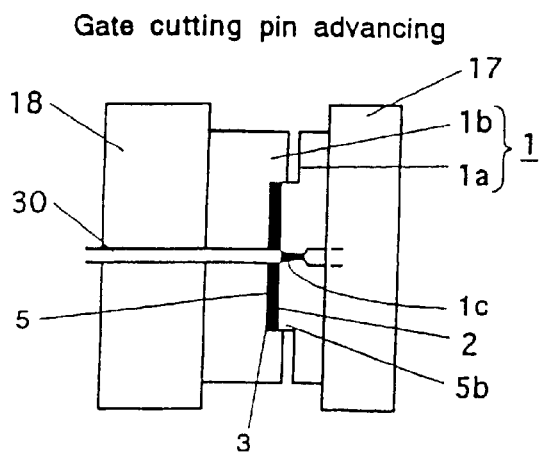
Fig. 18 (4)
Pressure holding and cooling
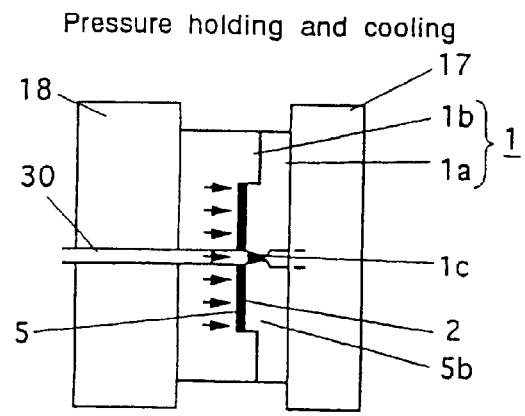
Fig. 18 (5)
Die opening
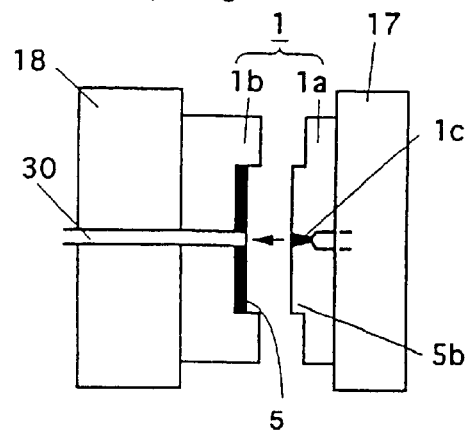
Fig. 18 (6)
Ejection
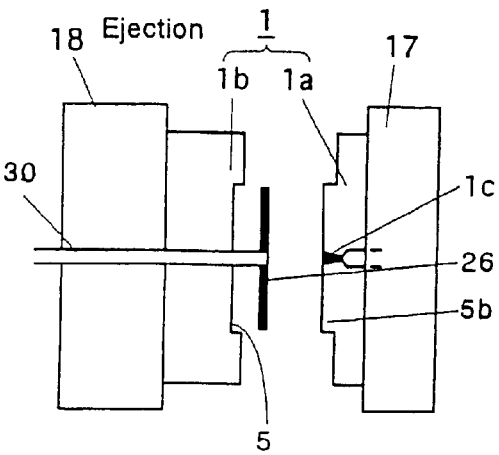

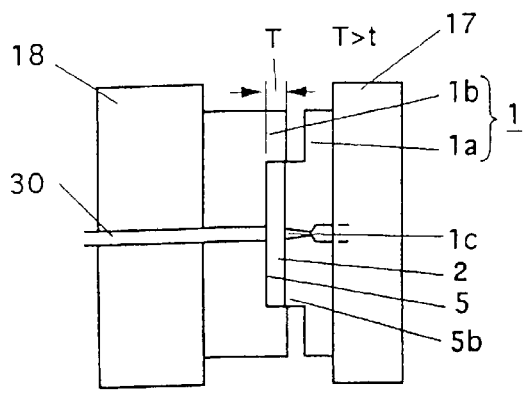
Fig. 20 (1)
Die closing
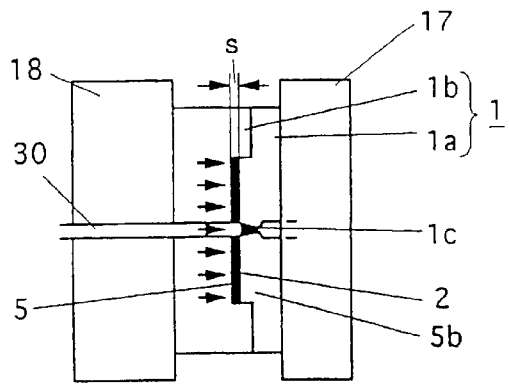
Fig. 20 (4)
Pressure holding and cooling
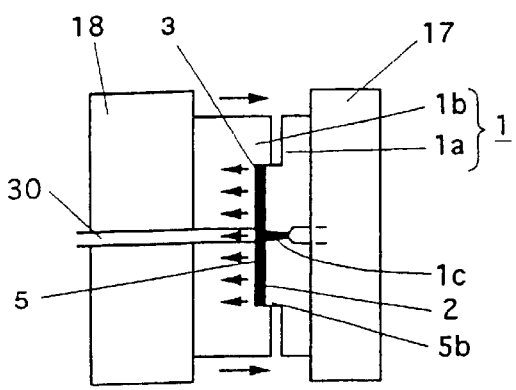
Fig. 20 (2)
Injection
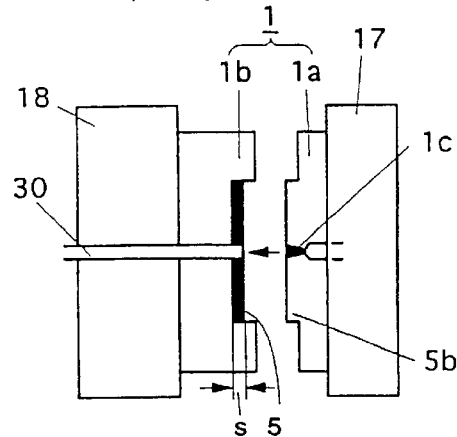
Fig. 20 (5)
Die opening
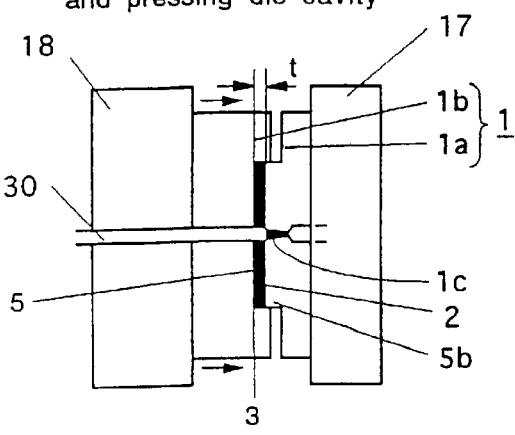
Fig. 20 (3)
Gate cutting pin advancing
and pressing die cavity
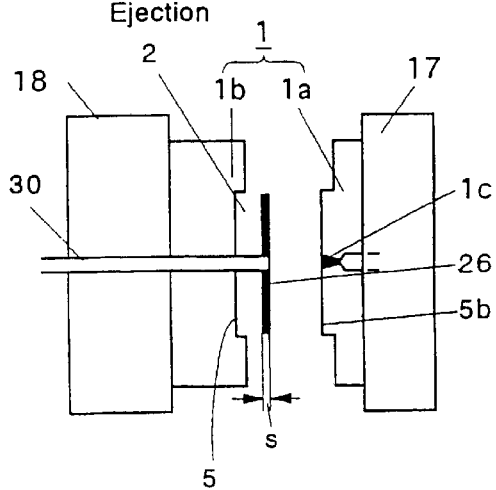
Fig. 20 (6)
Ejection

METHOD OF CONTROLLING A COMPRESSION INJECTION MOLDING MACHINE

This application is a Division of application Ser. No. 09/110,130 Filed on Jul. 6, 1998 now U.S. Pat. No. 6,183,235.

FIELD OF INVENTION

The present invention relates to an electrically-operated injection molding machine using a servo motor as a drive source of the injection molding process, and more specifically to an electrically-operated injection molding machine for super-precision molding using servo motors for a product eject process and a molding removal process as well as an injection compression molding method using the relevant machine.

BACKGROUND OF THE INVENTION

The injection molding machine using servo motors for drive sources of each process has been popularly used now. However, even in such event, servo motors are used at most for drive sources, such as (1) injection into die cavities of weighed resin, (2) weighing of blended resin, (3) opening and closing of dies, (4) gate cutting, etc., and there has been no case in which servo motors are used in the product eject process. This is because as shown in FIG. 21, the location of screw mechanism for gate cutting is concentrated with an extremely large number of mechanisms, and an air cylinder has conventionally been used for drive sources of the product eject pin for a device that can be barely contained in this portion.

First Problem

As observed recently, when the high cycle of injection molding machines advances gradually, the time for removing ejected products causes problems. An attempt to shorten time naturally requires accurate response at this portion. However, the air cylinder has limitations in response speed as well as variations in response timing, and the shortening and improvement in accuracy in product removal from the air cylinder have reached their limits.

To show one example, assume that the desired production cycle time per product is 3 seconds, the time assigned from eject to product removal is 0.12–0.15 second, whereas when an air cylinder is used, 0.2 second is required, and approaches by the air cylinder become extremely difficult.

In addition, because there are variations in repetitive response accuracy of the air cylinder on order of 0.01 second, an allowance from 0.02–0.05 second must be provided for timing of product removal carried out by a product removing equipment (not illustrated), and when still higher cycle is aimed at, the air cylinder has a problem of large time loss in shortening of the overall time.

Second Problem

In the electrically-operated injection molding machine of the conventional example using servo motors, each servo motor is feedback controlled in each process based on the program data for servo control. This takes in the data from the encoder equipped to the relevant servo motor into CPU for arithmetic, and the position, speed, torque, etc. are feedback controlled as specified in the program.

However, this kind of control method is an indirect control method of the position, speed, torque, etc. via the encoder equipped to the servo motor, and has been unable to directly detect injection pressure, weighed resin pressure, and die clamping force, etc. actually applied to the screw and dies and to feedback control based on the actually detected data. That is, because it was unable to find any place to install a pressure sensor for directly detecting the die clamping force applied to the dies, it was unable to directly detect the die clamping force and carry out feedback control.

Third Problem

In the electrically-operated injection molding machine which uses many servo motors, using one servo motor for one operating mechanism results in too many servo motors, causing disadvantages of not only enormous equipment costs but also complicated control.

Fourth Problem

Recently, the digital technique has been popularized in various fields including data processing, images, and music, and as a natural consequence, for example, CD, MD, DVD, and other digital substrates have been put into practical use. In particular, in PVD substrates, it is required to transfer super fine protrusions and recessions formed on dies accurately to moldings, and hydraulically-controlled conventional injection molding machines are no longer able to satisfy the requirements.

Consequently, injection molding machines which use many servo motors as described above, though partly, have been developed. And as this kind of increased precision of injection moldings advances, not only injection molding machines but also injection molding methods have continuously evolved. In this kind of injection molding machines, the following will govern the substrate accuracy.

For example, taking molding of optical disk substrates for example, warpage of moldings, adhesion of foreign matter, void, discoloration by gas, molding cycle, etc. constitute extremely important factors, but above all, the biggest problems are (1) super fine pitch, (2) pit transferability of depth, (3) realization of double refraction of 50 nm or less, and it is possible to suppress double refraction by alleviating (photoelasticity coefficient x main stress difference [=shear stress+thermal stress]).

Now in substrate molding, (1) microvoids and (2) micro flowmarks can be mentioned for factors that check transferability of fine protrusions and recesses.

That is, when resin flows along fine protrusions and recessions, air entrapping phenomena occurs in the resin flow in the front and the rear of the wall of fine protrusions and recessions, and fine air pools are formed. This fine air pool causes degraded transferability, and the countermeasure is to suppress resin solidification by high-speed filling as much as possible and to complete filling. However, this was insufficient. by conventional injection molding method. In addition, timing of injection compression is an important factor.

The foregoing description can be summarized as follows. In these several years, practical application and its development of digital substrates have been remarkable, and new deployment of injection molding machines and injection molding technique has been called for. At the same time, the demand for still higher cycle of forming speed has been exceptional, and for a solution, adoption of the servomechanism of all the drive units has been promoted.

(1) It is the screw mechanism for ejection for removing moldings from dies and direct detection of resin filling pressure and clamping force to dies at the die portion that constitute bottlenecks in adopting servomechanism. Even if pressure sensors are intended to be installed to the movable die side for directly detecting resin filling pressure or die clamping force, there is a limitation in space, and even when the pressure sensor is installed on the movable die side, there is a restriction in that the screw mechanism for ejection is unable to be installed unless some special construction is adopted, and in addition, it is also a limit in space.

(2) The adoption of servomechanism naturally means feedback control, but because in conventional cases, actual resin filling pressure and die clamping force were unable to be detected, they must be processed by feedback control using the data from the encoder attached to the servo motor.

(3) The reduced number of servo motors is quoted as one of the requirements together with adoption of servomechanism.

(4) Another object of requirements for adoption of servomechanism lies in improvement of transferability of super fine protrusions and recessions for, for example, optical digital substrates.

SUMMARY OF THE INVENTION

Now, problems the present invention intends to solve are described as follows in due order.

To consider in this way, if further higher cycle is intended, epochmaking innovation in the product eject system has been desired with respect to the first problem to be solved, because the product ejection by an air cylinder has already reached its limit. In other words, the object of this invention is (1) to develop a novel mechanism that can substitute for the cylinder system in order to achieve still higher cycle and to enable product removal without time loss in linkage with this new mechanism, and (2) to be able to install the new mechanism that substitutes for the cylinder system smoothly to a complicated gate cut mechanism portion.

In the second problem to be solved, because the servo motor is used for a driving source, it is an object of this invention not only to achieve higher cycle but also to directly detect weighed resin pressure and die clamping force exerted to dies in order to carry out feedback control. In particular, it is an object of this invention to enable direct detection of die clamping force on the die mechanism side, which has been considered impossible.

The third problem to be solved is to allow one servo motor to carry out two or more tasks to reduce the number of servo motors, because the use of many servo motors results in increased costs and complication of control, and it is an object of this invention to achieve reduction in manufacturing costs and simplification in control without degrading the performance by allowing one servo motor to cover gate cutting and molding ejection processes.

The fourth problem to be solved is to develop an injection molding method in an electrically-operated injection molding machine using servo motors for simultaneously achieving requirements for higher cycle of forming, improved transferability of fine protrusions and recessions formed on the dies, and stabilization of the molding quality, and control of speed for injecting weighed resin to die cavity, control of gate cutting timing, die compression speed, and die compression pressure as well as positional control of dies for achieving uniform molding thickness must be properly carried out to achieve this, and these requirements have never been achieved with the capabilities of conventional equipment which has employed a hydraulically-driven die compression forming method.

The fifth problem to be solved is to further improve the transferability of fine protrusions and recessions by eliminating fine air pools generated between fine protrusions and recessions and the solidified skin layer through eliminating the generation of the solidified skin layer as much as possible with further improvement in the die compression forming method.

The first configuration of the invention is to achieve the first object and is characterized by an injection molding machine (A) used for a precision forming injection molding method that has servo motors ( 1), (12), (31), (40), (45), and (51) used for driving sources in processes of weighing blended resin (3b), of injecting weighed resin (3a) into a die cavity (2), of opening and closing dies, of gate cutting after filling weighed resin (3a) into the die cavity (2), of ejecting the molding (26) after forming, and of removing the molding (26).

According to this configuration, because all the motions of injection operation are controlled by servo motors (11), (12), (31), (40), (45), and (51), the timing, injection speed, pressurizing speed, pressurizing pressure, and all others can be freely controlled, and not only the transferability of fine protrusions and recessions formed on the inner surface (5) of the die cavity (2) can be remarkably improved, but also the cycles can be increased because complex motions can be carried out by servo motors (11), (12), (31), (40), (45), and (51).

In particular, because servo motors (45), (51) are used for driving sources of ejection of molding. (26) after forming and removal of molding (26), there is no variation in repetitive response accuracy in motion, product removal timing by the product removing equipment (S) can be reduced to 0.01 second or less, and ultimately higher cycle is able to be achieved.

The second configuration of the invention is characterized by an injection molding machine (A) having:

(a) a gate cutting screw mechanism (G);

(b) a gate cutting member (30) connected to said gate cutting screw mechanism (G) and placed to a movable die (1b) where it is allowed to make reciprocating movements freely;

(c) a servo motor (51) for operating said gate cutting member (30) via the gate cutting screw mechanism (G);

(d) an ejection screw mechanism (E);

(e) an ejection member (27) connected to said ejection screw mechanism (E) and placed to the movable die (1b) where it is allowed to make reciprocating movements freely;

(f) a servo motor for operating the ejection member (27) via the ejection screw mechanism (E), wherein a screw shaft (30a) of the gate cutting screw mechanism (G) and a center ejecting bar (27a) of the ejection screw mechanism (E) are arranged on the same axis, and the center ejecting bar (27a) is inserted in the screw shaft (30a);

and the gate cutting screw mechanism (G) is located closer to the dies(1) than the ejection screw mechanism (E).

According to this configuration, because the gate cutting screw mechanism (G) and the ejecting screw mechanism (E) are aligned in one line and the straight portion (27b) is inserted in the screw shaft (30a), the gate cutting screw mechanism (G) and the ejection screw mechanism (E) with complicated mechanisms can be smoothly located in this portion.

The third configuration of the invention relates to the removal of a molding (26) in order to achieve the first object, wherein the injection molding machine (A) includes:

(a) a product removing equipment (S) controlled by a servo motor (45);

(b) an ejection screw mechanism (E) controlled by said servo motor(51);

(c) the product removing equipment (S) for removing the molding (26) from said movable die (1b) under a condition with little time loss or free of time loss by electrically controlling a timing for ejecting said molding (26) from the die cavity (2) and the timing for removing the molding (26) by operating the ejection screw mechanism (E). As described before, the repetitive response accuracy is free of variations when the molding (26) is ejected and the molding (26) is removed after molding. The product removal timing by the product removing equipment (S) can be 0.01 second or less, enabling the achievement of ultimate higher cycle.

The fourth configuration includes a means for solving the second problem, and relates to feedback control of the die clamping force by a pressure sensor (7) on the movable die (1b) side of the injection molding machine (A) having:

(a) a movable die plate for mounting said movable die (1b);

(b) a housing (50) with a toggle mechanism (T);

(c) a pressure sensor (7) placed between said movable die plate (18) and said housing (50):

(d) a servo motor for driving a toggle mechanism (T);

(e) and servo motors (11),(12) for injection control, wherein in a resin filling process, a reactive force of said movable die (1b) due to filling resin (3) in the die cavity (2) is detected by said pressure sensor (7);

resin injection into the die cavity (2) is feedback-controlled based on an output data of said resin (3) filled from said pressure sensor (7);

and in a die compression process and a following pressure-holding process, the feedback control on the die clamping force by said servo motor (31) and position control of said movable die (1b) are carried out based on the data from said pressure sensor (7).

According to this, because the pressure sensor (7) is placed between the movable die plate (18) and the housing (50), direct detection of resin pressure, die clamping force, or position control of the movable die (1b) at the time of injection filling which has been difficult to date has been made possible, and more accurate feedback-control of die clamping force and die-clamping stopping position has been enabled.

The control is applied in all the processes such as (1) part of the injection process from when filled resin (3) begin to come in contact with the dies (1) to gate cutting, (2) timing of gate cutting for closing the gate (1c) of the filled resin (3), process for compressing the filled resin (3) with dies (1), pre-stage of the pressure-holding process, and (4) position control, post-stage of the pressure-holding process.

The fifth configuration is an example of the pressure sensor (7) being between the movable die plate (18) and the housing (50) wherein a molding eject mechanism (E) is provided. An ejection member (27) for ejecting molding (26) is inserted in the movable die (1b) through the pressure sensor (7).

Another configuration includes an injection molding machine having:

(a) an ejection screw mechanism (E) equipped to the housing (50);

(b) ejection members (27) which are parts of said ejection screw mechanism (E) for ejecting the molding (26) in the die cavity (2) are inserted in the movable die (1b) through the pressure sensor (7). Consequently, if the pressure sensor (7) is intended to be installed, the molding ejecting mechanism (E) must be designed specially in such a manner to avoid the pressure sensor (7) as shown in FIGS. 1–6, and before this invention, there is no case in which the pressure sensor (7) is located between the movable die plate (18) and the housing (50).

However, this problem can be solved by providing a penetration hole (7a) in the pressure sensor (7), and the injection pressure, weighed resin pressure, and die clamping force exerted to dies (1) have been able to be directly detected by the pressure sensor (7).

A further implementation relates to a means for solving the third problem relative to an injection molding machine having:

(a) a hollow gate cutting member (30) slidably placed in the movable die (1b);

(b) an ejection member (27) slidably inserted in the gate cutting member (30);

(c) a gate cutting drive nut portion (44) for forwarding and reversing the gate cutting member (30), screwed to the threaded portion (30a) formed on the outer side of the screw shaft which is a part of the gate cutting member (30);

(d) an eject nut portion (49) for forwarding and reversing the ejection member (27), screwed to a screwed portion (27s) of the center eject bar which is the part of said ejection member (27);

(e) a pulley for simultaneously rotating the gate cutting drive nut portion (44) and the eject nut portion (49);

(f) and the gate cutting drive nut portion (44) and the eject nut portion (49) are inversely threaded each other.

According to this, because rotating the driven pulley (43) to protrude the gate cutting member (30) reverses the ejection member (27) and conversely discharging the ejection member (27) to eject the molding (26) reverses the gate cutting member (30), gate cutting and ejection of the molding (26) can be driven with one servo motor (40) and the number of servo motors can be reduced without degrading the equipment performance, and the control can be simplified.

Another aspect of the present invention relates to a first method of die compression for solving the fourth problem that is characterized by operating a die compression injection molding machine that has:

(a) a movable die (1b) mounted on a movable die plate (18);

(b) a pressure sensor for detecting reaction force of said movable die (1b) caused by resin (3) filled in a die cavity (2), placed between said movable dieplate (18) and the housing (50) connected to the toggle mechanism (T), wherein at least, either of pressure control of filling resin (3) by the movable die (1b) or thickness control of filled resin (3) by position control of the movable die (1b) is carried out based on the output data from said pressure sensor (7).

According to this configuration, the control which is an important factor in the pressure-holding process is carried out by the reaction force directly obtained from the filled resin (3), enabling realtime and accurate control.

Another aspect of the invention relates to the control of operation timing of a gate cutting member (30) and is characterized by the die compression injection molding method operating an injection molding machine (A) for precision molding having:

(a) a movable die (1b) mounted on a movable die plate (18);

(b) a pressure sensor (7) for detecting the reaction force of said movable die (1b) by resin (3) filled in the die cavity (2), placed between the movable die plate (18) and the housing (50) connected to the toggle mechanism (T);

(c) and a gate cutting member (30) for closing the die gate (1c), wherein an operating timing of said gate cutting member (30) is controlled based on the output data from said pressure sensor (7).

According to this configuration, timing control of gate cutting, one of the important factors in the injection molding process is carried out by the reaction force directly obtained from filled resin (3), and real-time and accurate control is achieved.

Another aspect of the invention relates to resin injection speed control by a pressure sensor (7) output and is characterized by a die compression injection molding method for a injection molding machine (A) for precision molding having:

(a) a movable die (1b) mounted on a movable die plate (18) and a stationary die (1a) mounted on a stationary die plate (17);

(b) a pressure sensor for detecting the reaction force of the dies (1) by resin (3) filled in the die cavity (2), placed between the movable die plate (18) and the housing (50) connected to the toggle mechanism (T);

(c) and the. injection mechanism portion (a) for injecting resin (3) into said dies (1), wherein the resin injection speed control from the injection mechanism portion (a) into the dies (1) is controlled based on the output data from said pressure sensor (7).

According to this configuration, the injection process, one of the important factors in the injection molding process, in particular, injection speed control is carried out by the reaction force directly obtained by the filled resin (3), and real-time and accurate control is enabled.

Another aspect of the invention relates to a method of die compression injection molding using an injection molding machine (A) for a precision molding that includes;

(a) injecting weighed resin (3a) into a die cavity (2) of dies (1) in the course of moving- in a die closing direction of a movable die (1b);

(b) carrying out gate cutting when a specified amount of resin (3) is filled, continuously moving the movable die (1b) in the die closing direction to a specified position as it is without stopping, (c) keeping the dies (I) clamping with holding pressure at said specified die clamping position during holding pressure process and cooling process, (d) after said cooling process , removing the molding from the open dies (1).

According to this configuration, because the movable die (1b) is continuously moved in the die closing direction from the start of injection filling of the weighed resin (3a) to the start of die clamping, the filled resin (3) cooperates with the movement of the movable die (1b) to increase the relative speed of the filled resin (3) with respect to the movable die (1b), and as a result, the filled resin (3) comes in contact with the inner side of the die cavity (2) and flows more quickly, allowing the new resin inside to expose to the surface of the resin (3), and formation of the skin layer of the resin surface is hindered. As a result, the transferability of fine protrusions and recessions to the molding (26) is remarkably improved.

Another aspect of the invention relates to the amount of filled resin (3) in the die cavity (2) exceeding a volume of the molding (26).

According to this, because the filled resin (3) of a volume exceeding the volume of the molding (26) is compressed to the volume of the molding (26) by compression molding, the molding (26) forms a high-density substrate free of variations in density and contributes to the improvement in the quality.

Another aspect of the invention relates to forming fine protrusions and recesses for transferring to the filled resin (3) on the inner side (5) of the die cavity (2) of the movable die (1b) described above, the filled resin (3) cooperates with the movement of the moveable die (1b), increases the relative speed with respect to the movable die (1b), comes in contact with the inner surfaces (5) of the die cavity (2) in the movable die (1b) while constantly exposing the new resin inside to the resin surface, and flows quickly. As a result, the formation of the skin layer on the resin surface is hindered, and this hinders generation of fine air pools that impair the transferability.

If fine protrusions and recessions are formed on the inner surface (5) of the die cavity (2) in the movable die (1b), the transferability can be remarkably improved by this method.

BRIEF DESCRIPTION OF DRAWINGS

FIG. 18 (1)–(6) are cross-sectional views showing the die operating condition in the whole injection process of this invention.

FIG. 20 (1)–(6) are cross-sectional views showing the operating condition of dies in the whole injection process of this invention.

DETAILED DESCRIPTION OF THE PREFERRED EMBODIMENT

Embodiment

Figure 8:
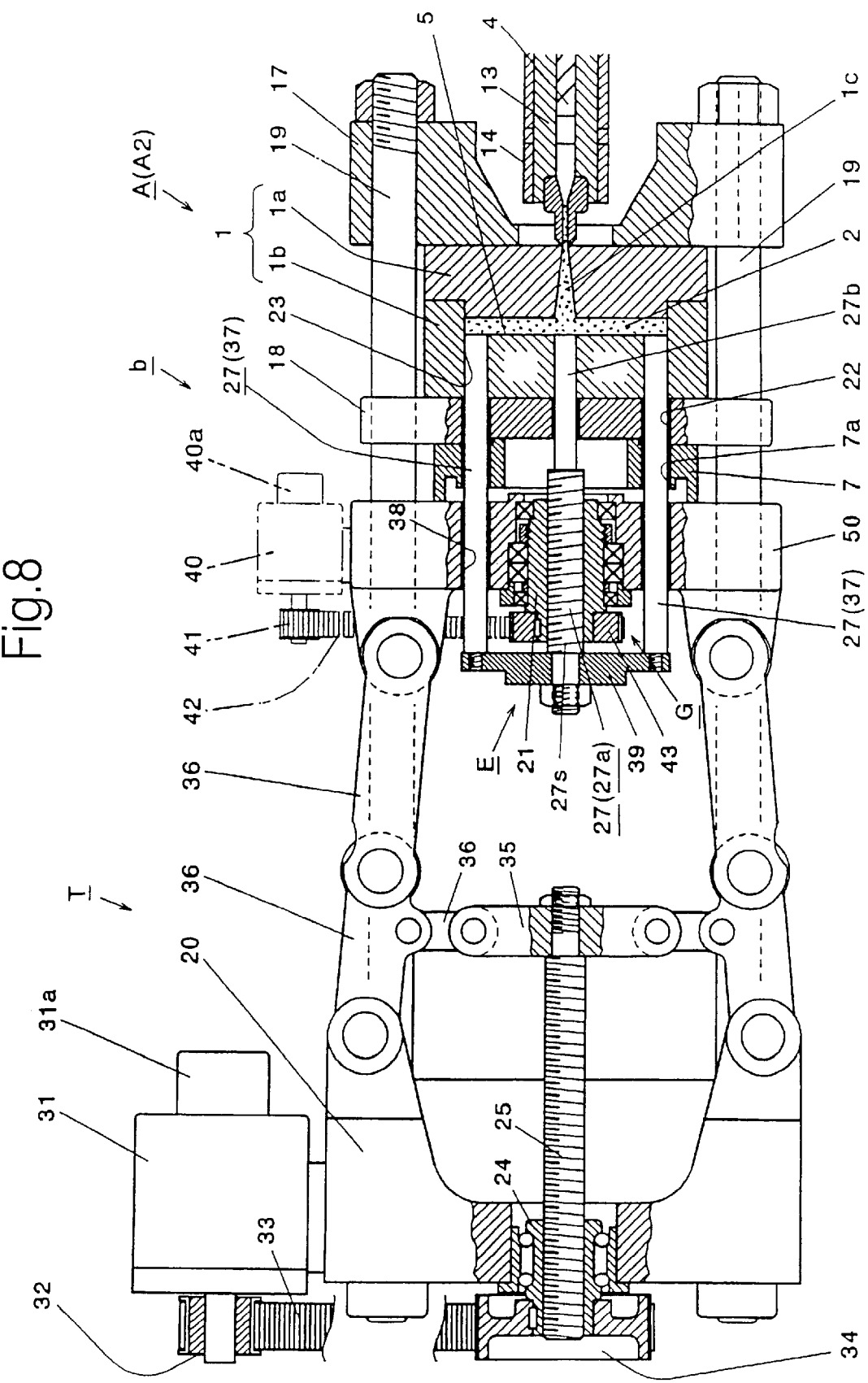
FIG. 8 is an enlarged cross sectional view at the time of die clamping in the die mechanism portion of the second embodiment of this invention.
Figure 9:
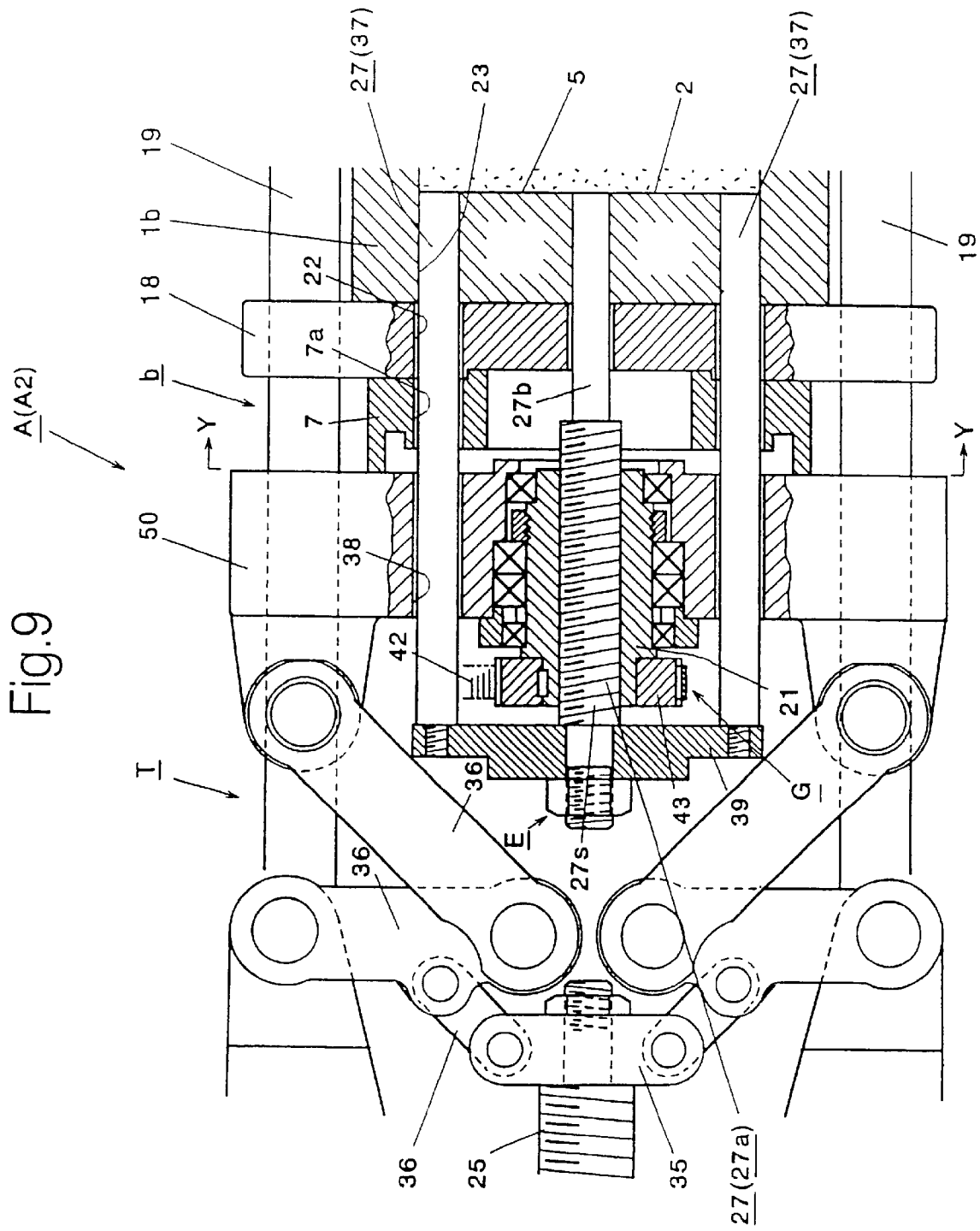
FIG. 9 is an enlarged cross-sectional view in the molding ejection mechanism of the die mechanism portion of FIG. 8.
Figure 10:
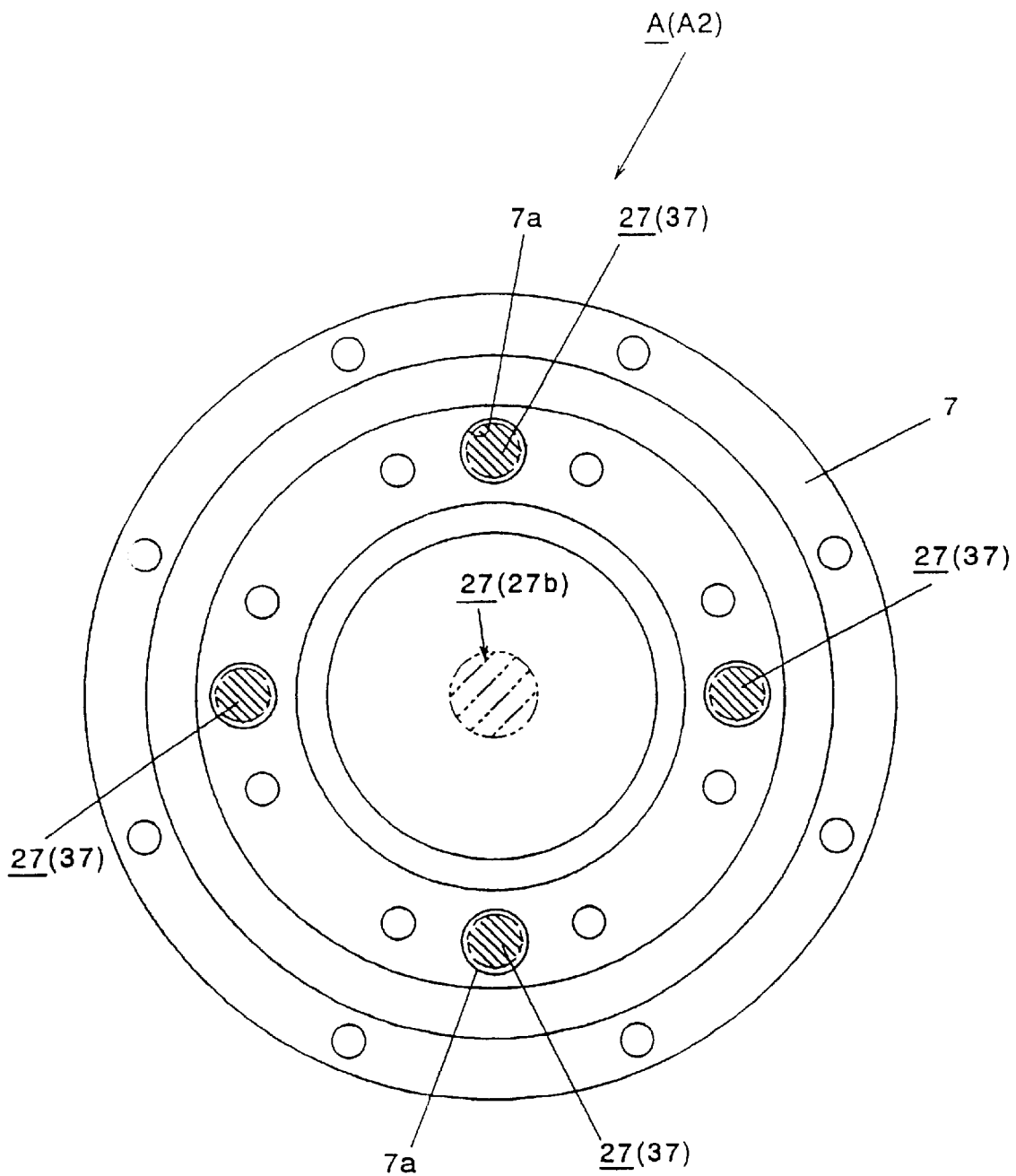
FIG. 10 is a cross-sectional view taken on line Y—Y of FIG. 9.
Figure 11:
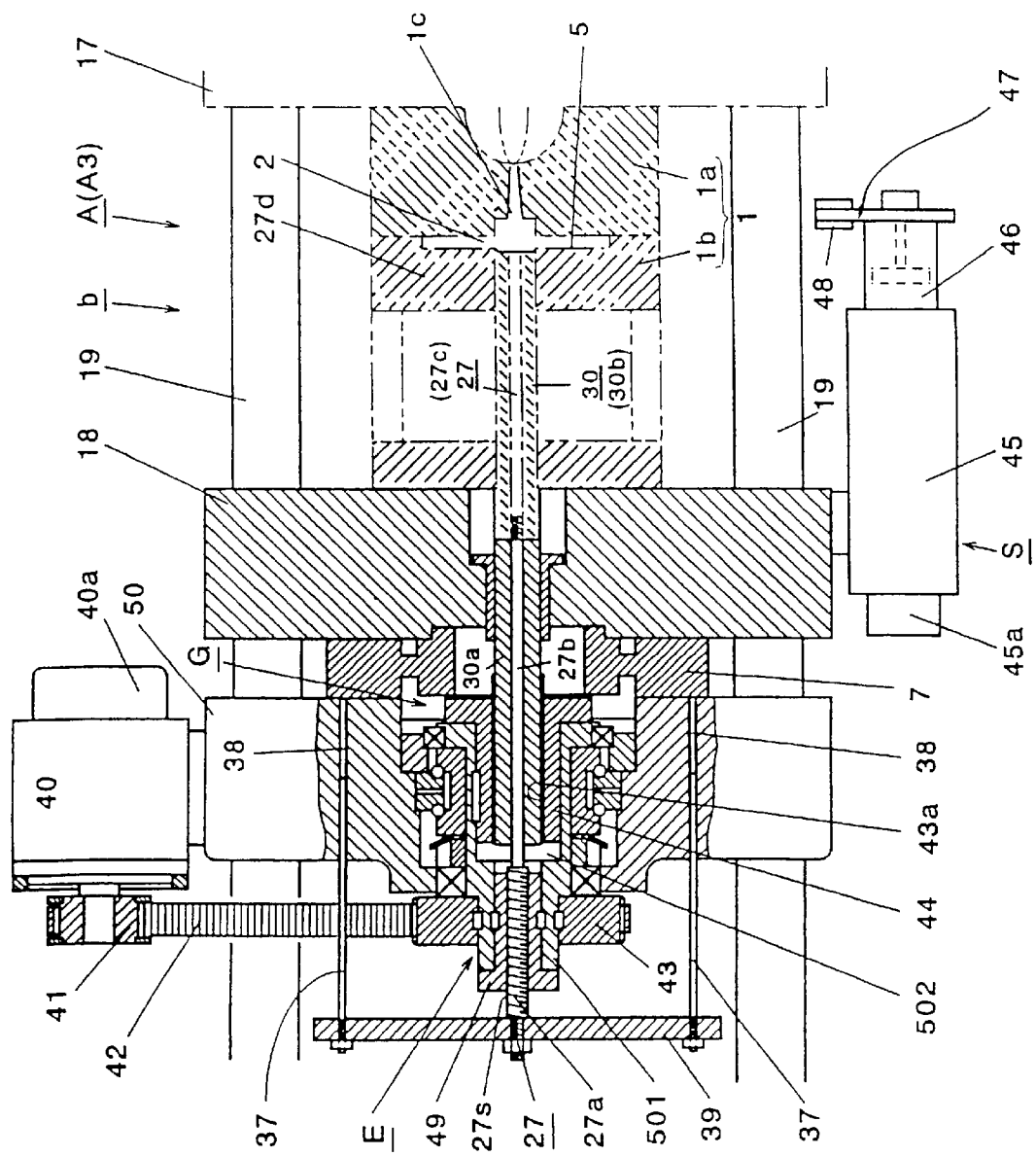
FIG. 11 is an enlarged cross-sectional view at the time of die clamping in the die mechanism portion of the third embodiment of this invention.
Figure 16:
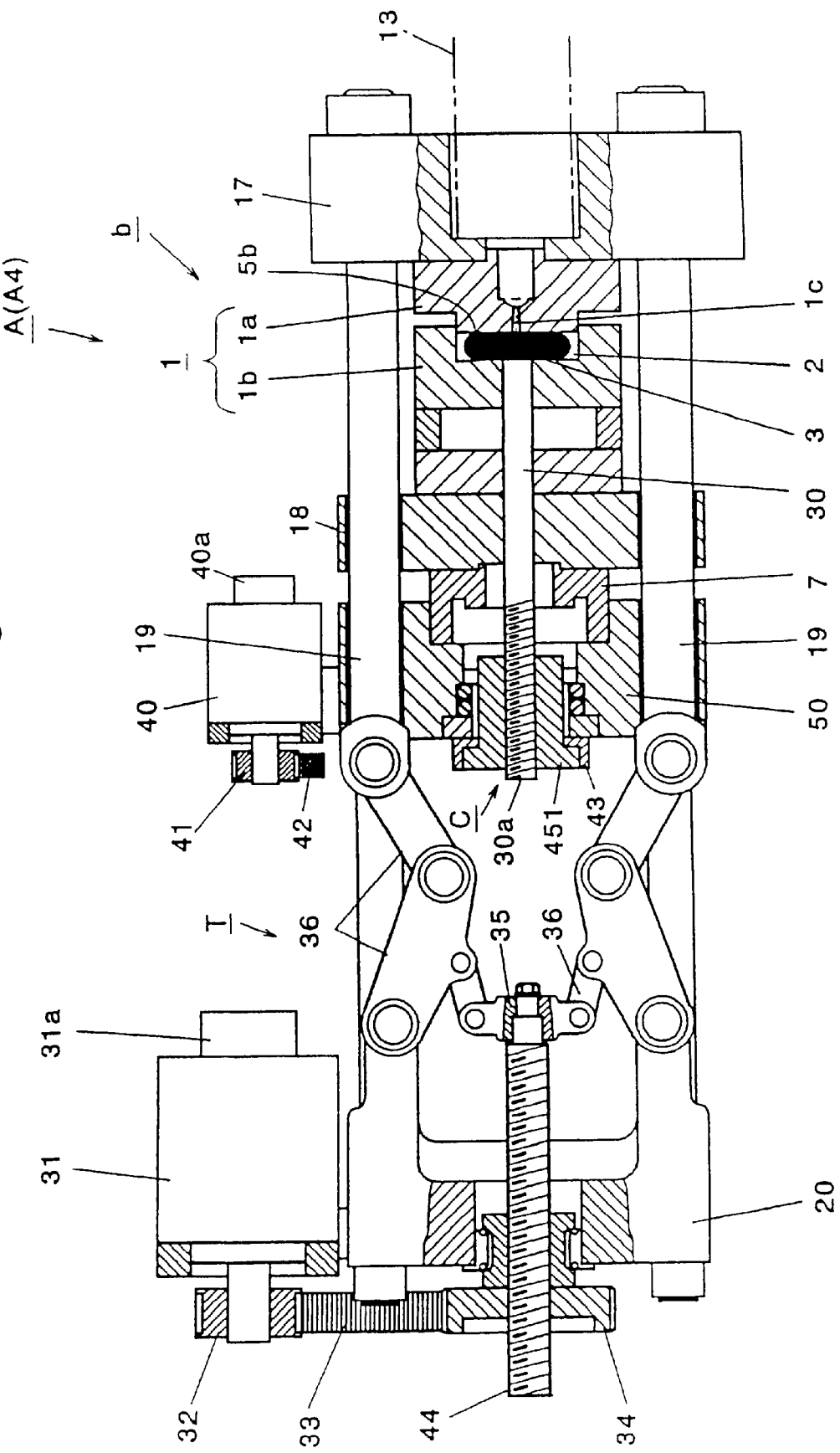
FIG. 16 is an enlarged cross-sectional view when resin is filled in the drawing of the die mechanism portion of the fourth embodiment of this invention.
Figure 17:
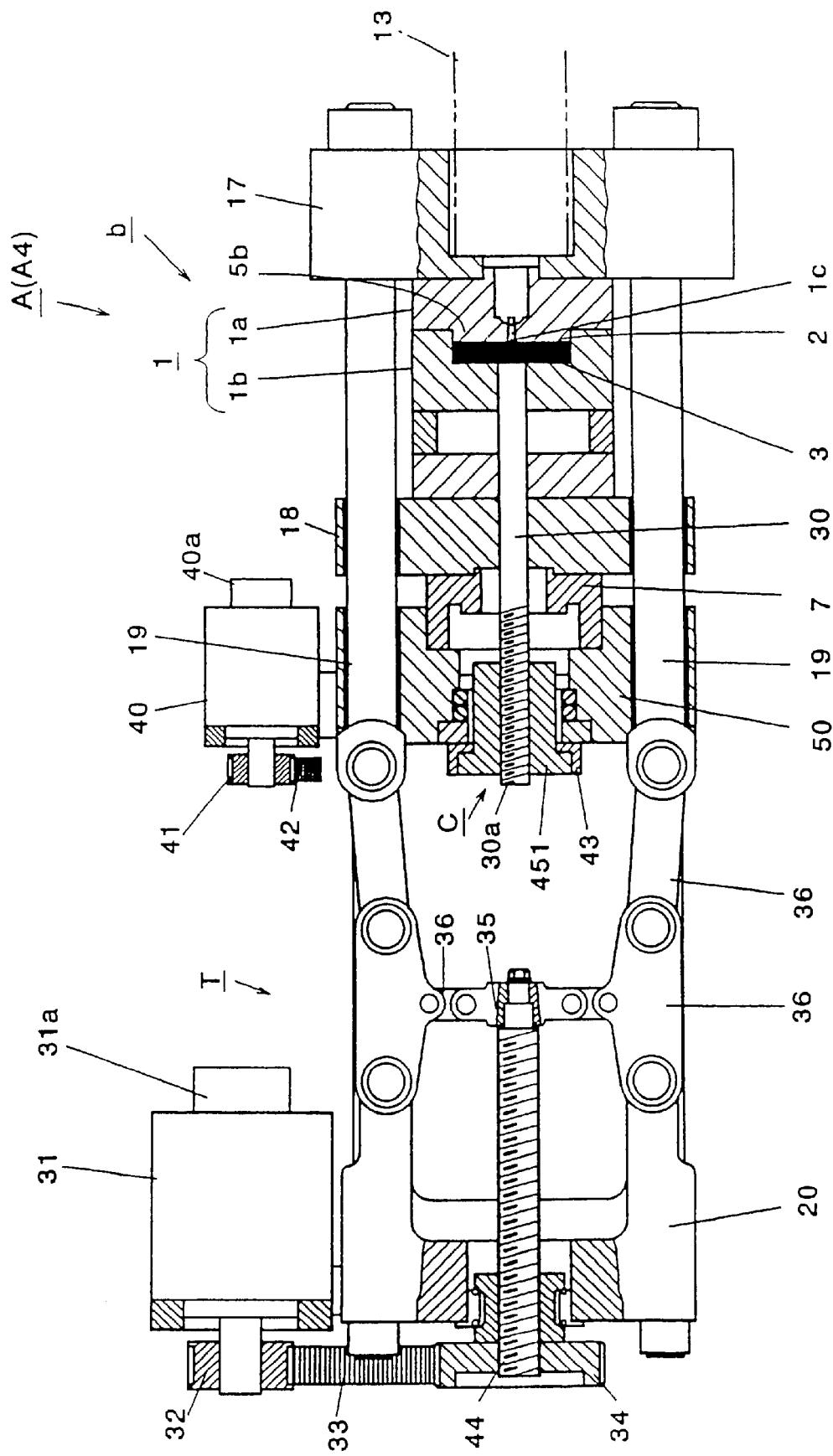
FIG. 17 is an enlarged cross-sectional view at the time of die compression in the drawing of the die mechanism of FIG. 16.
Figure 19:
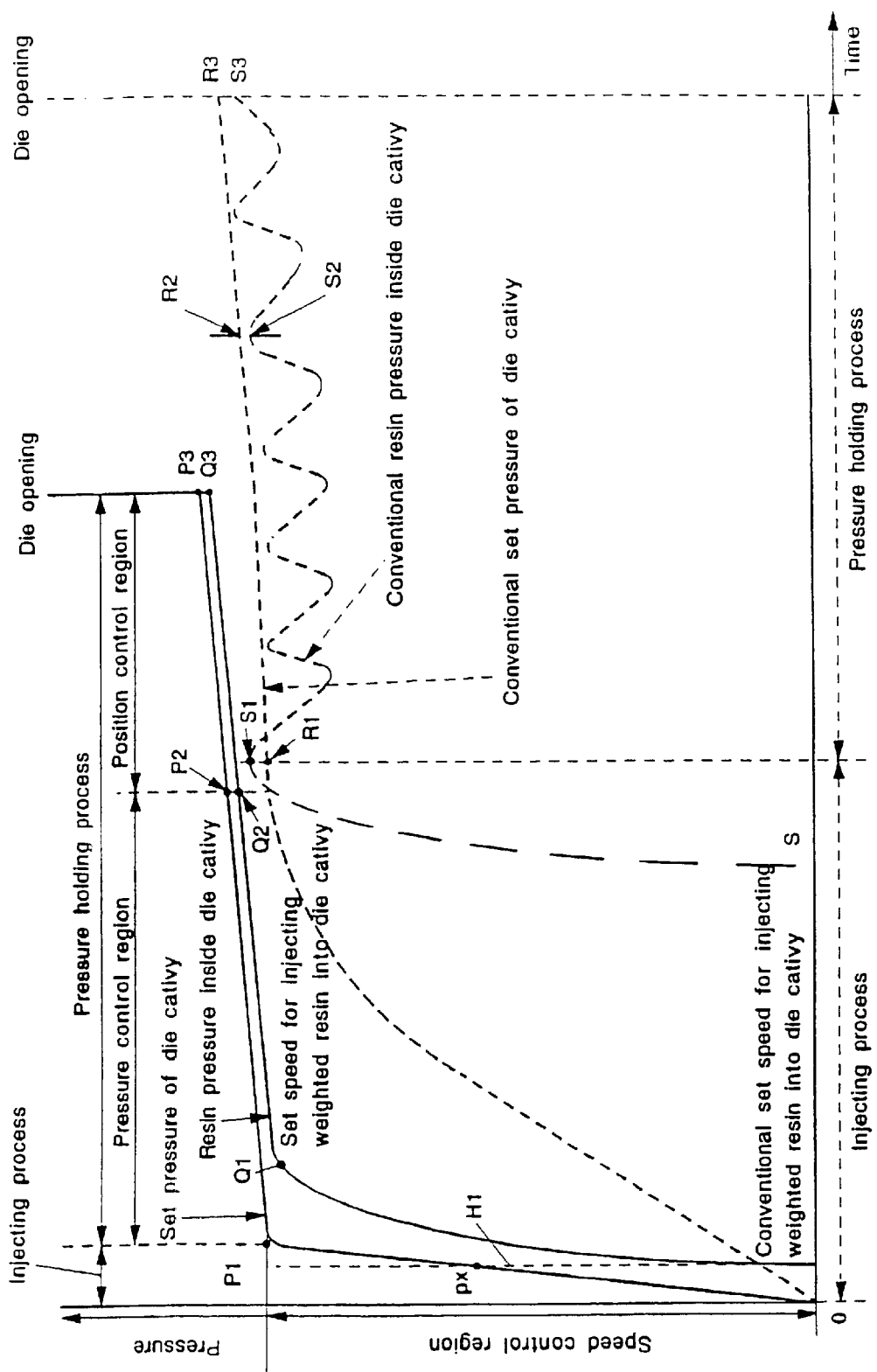
FIG. 19 is a graph comparing pressure setting changes and pressure sensor outputs with pressure settings and hydraulic sensor outputs of a conventional example.
Figure 21:
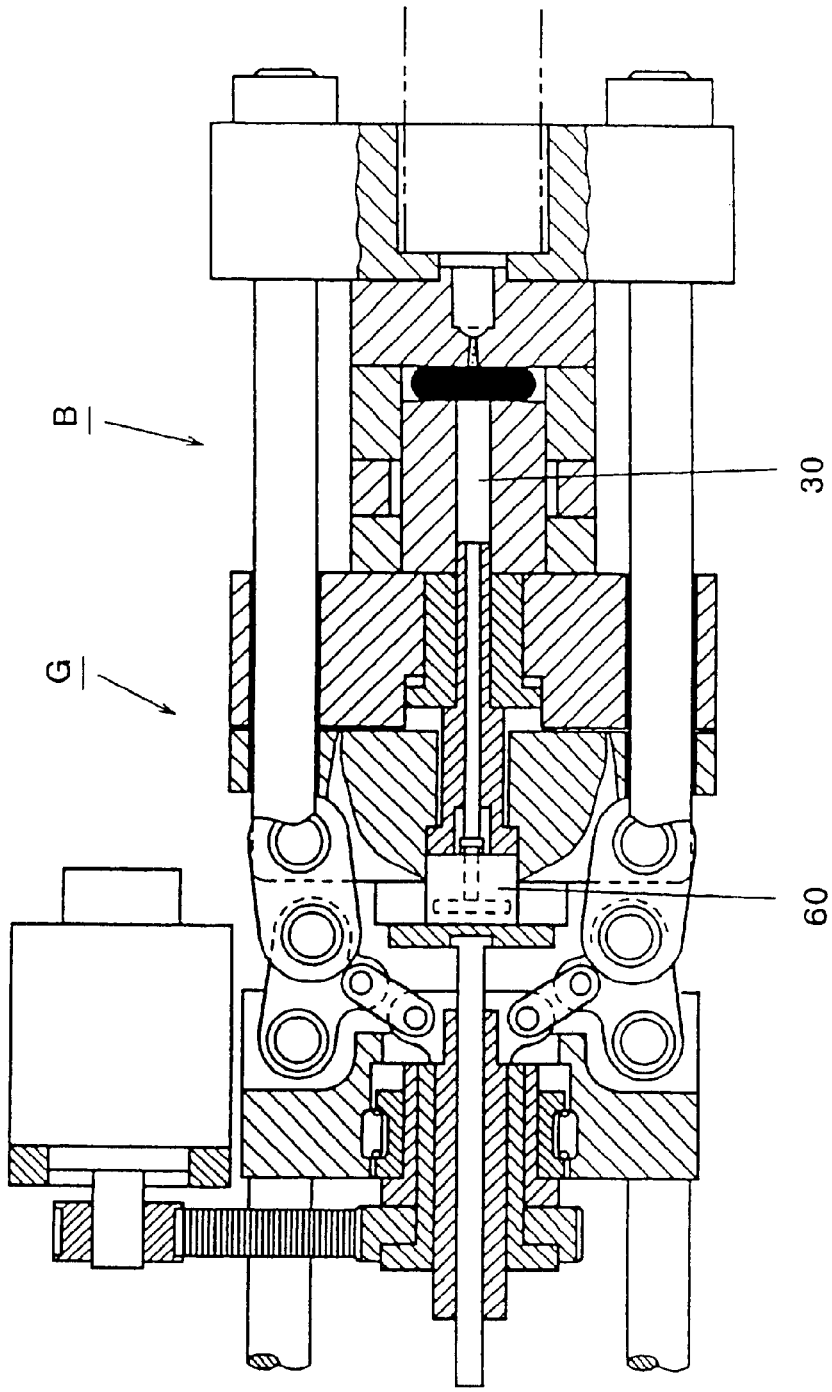
FIG. 21 is a sectional fragmentary schematic illustration of the partly omitted construction of a mechanism portion of a conventional example.

Referring now to the drawings, embodiments of the electrically-operated injection molding machine (A) according to the present invention will be described in detail hereinafter. In this specification, first through fourth embodiments of the electrically-operated injection molding machine (A) are shown. The first embodiment (A1) is shown in FIGS.1 through 7, the second embodiment (A2) is shown in FIGS. 8 through 10, the third embodiment (A3) in FIGS. 11 through 15, and the fourth embodiment (A4) in FIGS. 16 and 17. The first method of the injection molding machine according to this invention is shown in FIG. 18 and the second method in FIG. 20, respectively.

First, the configuration and operation of the first embodiment (A1) of the electrically-operated injection molding machine (A) will be described, then, the points that differ from the first embodiment (A1) will be described with respect to the second and after embodiments in order to avoid redundancy. Throughout this specification, like reference characters designate like or corresponding parts which carry, out like or corresponding operations.

First of all, the first embodiment (A1) will be described in detail referring to FIGS. 1 through 7. The electrically-operated injection molding machine (A1) according to this invention can be generally divided into an injection mechanism portion (a) and a die mechanism portion (b).

The injection mechanism portion (a) comprises a drive mechanism portion (10) for forwarding and reversing the screw (4), a rotation servo motor (11) for rotating the screw (4), an injection servo motor (12) for forwarding and reversing the screw (4), the screw (4) for blending and injecting material resin, an injection cylinder (13) that houses the screw (4) free of forwarding and reversing and rotating, a heater (14) which is wrapped around the injection cylinder (13), an injection pressure sensor (15) placed between the screw (4) and the drive mechanism portion (10) and for detecting pressure applied to the screw (4), and pulse generators (11a), (12a) mounted on each of the servo motors (11), (12). These are common to all the embodiments (A1) through (A4) of this invention.

Next description will be made on the die mechanism portion (b). The dies (1) comprise a movable and a stationary dies (1a). The stationary die (1a) is mounted on the inner side of the stationary die plate (17), and the movable die (1b) is mounted on the inner side of the movable die plate (18). A housing (50) is mounted on the outer side of the movable die plate (18) via the pressure sensor (7) for detecting a resin pressure, which is fixed between the housing (50) and the movable die plate(18).

At the center of the back surface of the housing (50) (that is, the opposite side of the movable die (1b)), a gate cutting screw mechanism (G) is mounted, and to the further back portion, an ejection screw mechanism (E) is mounted.

Tie bars (19) are spanned between the stationary die plate (17) and a tail stock (20), and the movable die plate (18) is slidably installed to the tie bars (19).

Next, the gate cutting screw mechanism (G1) of the first embodiment (A1) will be described. The driven pulley (43) of the gate cutting screw mechanism (G1) is rotatably placed to the housing (50) via a bearing, and a screw shaft (30a) is screwed through the center of the driven pulley (43) so that it forwards and reverses in accord with the normal and reverse rotation of the driven pulley (43). The gate cutting member (30) is formed by combining this screw shaft (30a) with the hollow gate cutting bar (30b) placed in the movable die (1b), but the screw shaft (30a) and hollow gate cutting bar (30b) may be integrated to form the gate cutting member (30).

The driven pulley (43) is connected to a driving pulley (41) of a servo motor (40) via a timing belt (42), and the gate cutting member (30) rotated by pulley (43). Numeral (40a) is a pulse generator mounted on the servo motor (40).

Now, the description is made on the ejection screw mechanism (E) of the first embodiment (A1). A driving pulley (52) fixed to the servo motor (51) of the ejection screw mechanism (E) is connected to a driven pulley (54) with a timing belt (53), and transmits the rotating force of the servo motor (51) to the driven pulley (54).

The driven pulley (54) is rotatably held at an projection portion (50a) of a housing (50) via a bearing. An screwed portion (27s) of the ejection center bar (27a) is screwed down through the center of the driven pulley (54) so that the ejection center bar (27a) forwards and reverses in accord with the normal and reverse rotation of the driven pulley (54). In this,embodiment, the driven pulley (54) is formed with two members, but needless to say, it may be formed in one or more members.

In addition, an ejection coupling bar (55) is mounted at the rear end of the screwed portion (27s) of ejection center bar (27a). The guide bars (56) and a product ejection operating bar (57) is mounted on the ejection coupling bar (55).

A guide bars (56) are slidably inserted in the guide holes (58) made in the projection portion (50a).

On the other hand, the straight portion (27b) with no screwed portion of the center ejection bar (27a) is inserted into the screw shaft (30a) in the direction of the gate, and the top end is brought into contact or connected with the center pin (27c) inserted in the hollow gate cutting bar (30b). In this case, the center pin (27c) and the straight portion (27b) are formed separately, but needless to say, they may be formed integrally.

A product ejection pins (27d) are placed in plurality places along the outer circumference of the die cavity (2) of the movable die (1b). The product ejection operating bar (57) presses against or separated from the coupling bar (28). When the product ejection operating bars (57) press against the coupling bar (28), it operates the product ejection pins (27d) to eject the product from the die cavity (2). After the ejection of the product from the die cavity (2), the product ejection pins (27d) return to the position where the top end of the product ejection pins (27d) agree with the inner surface(5) of the die cavity (2) by the return spring (29).

With the foregoing description, the ejection member (27) comprises the center ejection bar (27a), its straight portion (27b), center pin (27c), product ejection operating bar (57), coupling bar (28), (55), product ejection pins (27d), and returning spring (29).

Figure 1:
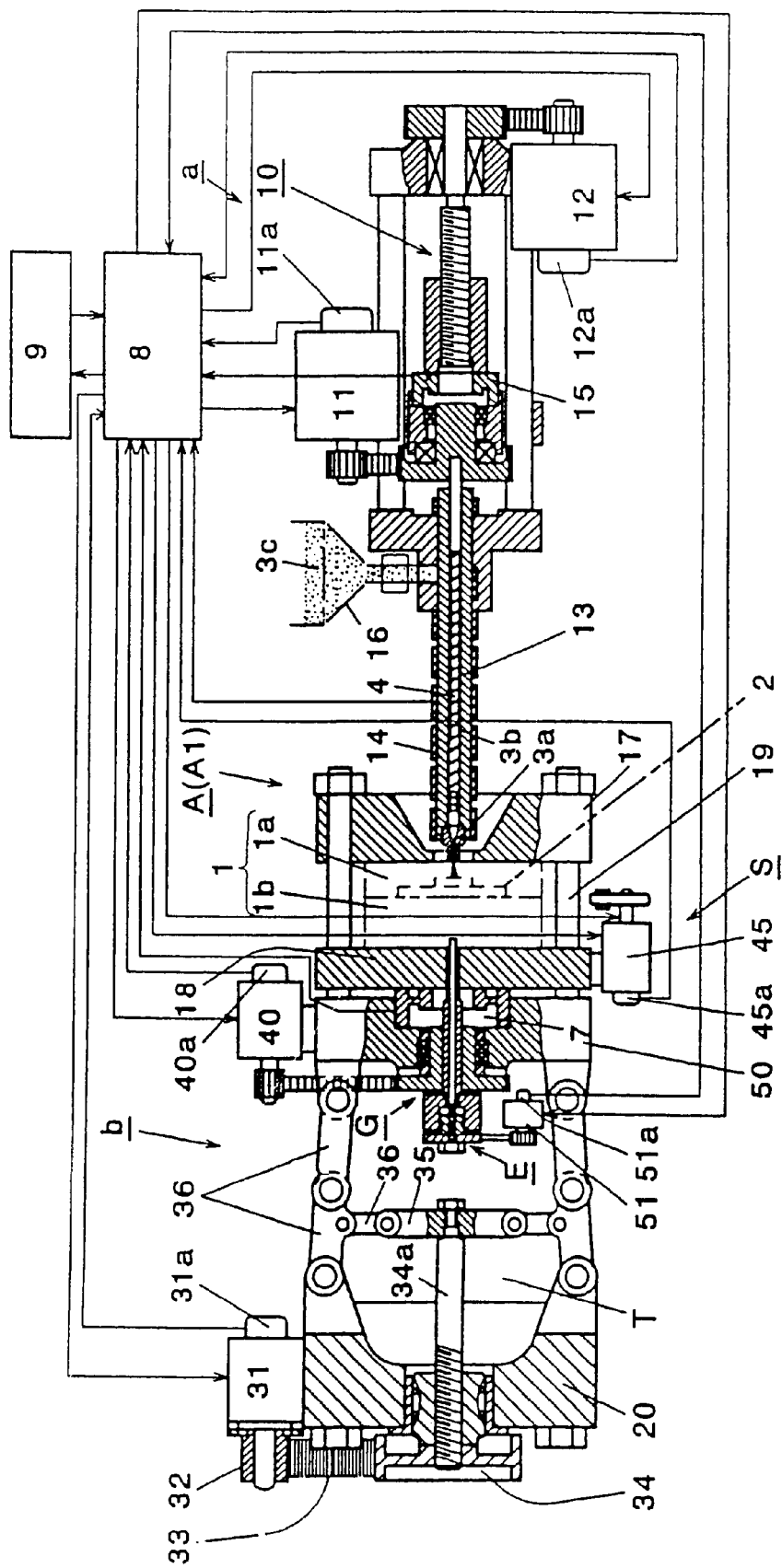
FIG. 1 is a sectional fragmentary schematic illustration showing a construction of the whole injection molding machine of the first embodiment (A1) of this invention.
Figure 2:
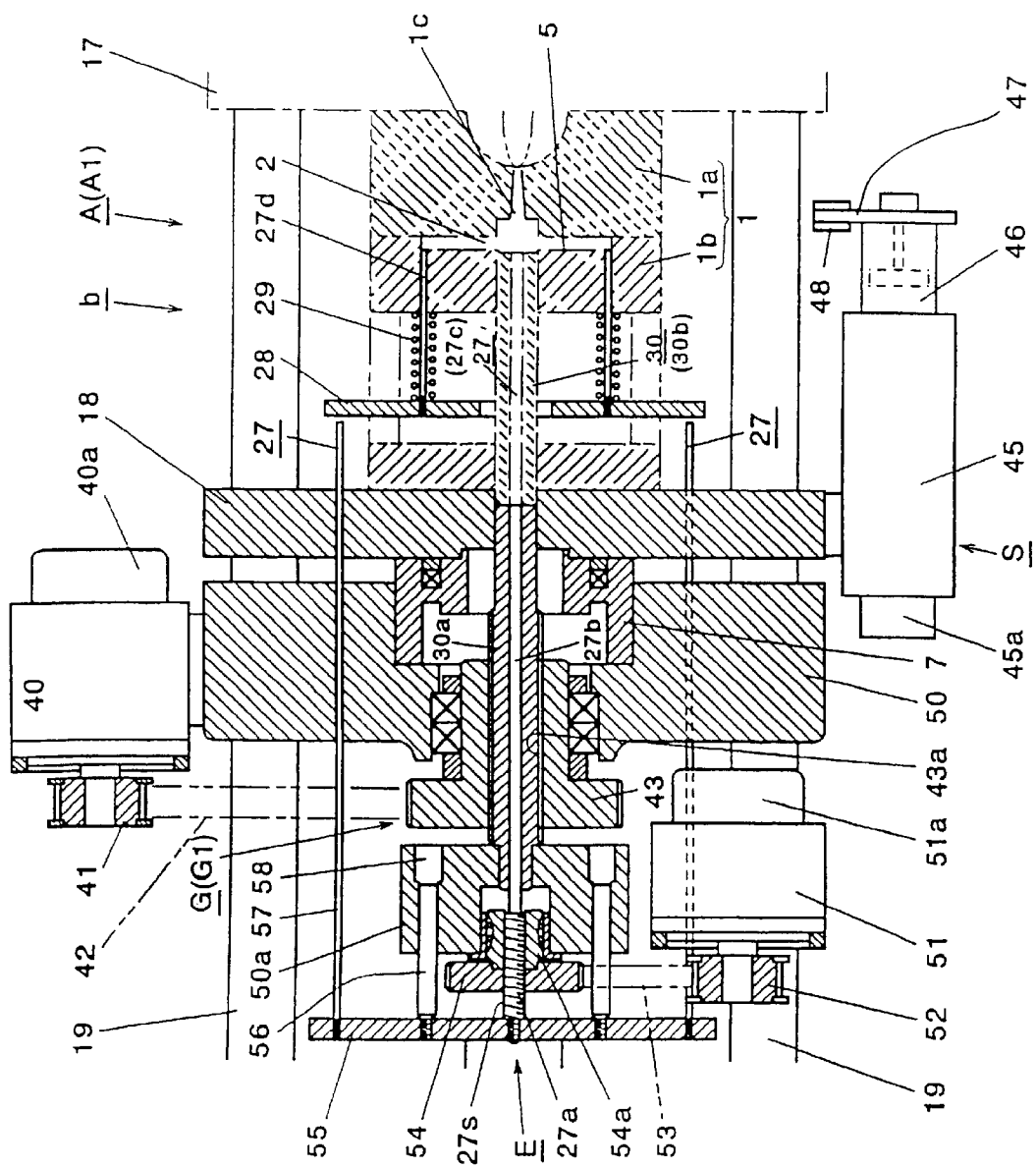
FIG. 2 is an enlarged cross-sectional view of the die mechanism portion of FIG. 1 at the time of die clamping.

When the molding (26) is ejected, the gate portion (26a) coming together with the molding (26) is dropped first by the center pin (27c), and then ejection of the molding (26) follows. In said molding ejection process, the beginning, the product ejection operating bars (57) are located at the home position by being pulled back as shown in FIG. 2, and the coupling bar (28) on the product ejection pins (27d) are held away from said product ejection operating bars (57). Next, the center pin (27c) is protruded first when the servo motor (51) is operated, as described above, and that, the product ejection pins (27d) are protruded to eject the molding (26). Naturally, the operating relation is not limited to this, the product ejection operating bar (57) may come in contact with the coupling bar (28) on the product ejection pin (27d) so that both may be ejected simultaneously. For other construction, though not illustrated, the product ejection operating bars (57) and the product ejection pins (27d) may be integrated without providing the coupling bar (28). Numeral (51a) is a pulse generator equipped to the servo motor (51).

Now, description will be made on the toggle mechanism (T) for dies opening and closing. A dies control servo motor (31) is mounted on a tail stock (20). A driving pulley (32) fixed to the rotation driving motor shaft is connected via a timing belt (33) to a driven pulley (34) placed to the tail stock (20) via a bearing. A pulse generator (31a) is mounted on the dies control servo motor (31).

A cross head driving shaft (34a) for handling the toggle is screwed down to the driven pulley (34). A cross head end of the cross head driving shaft (34a) is connected to the cross head (35) having the role of operating the dies opening and closing. The toggle (T) has two couples of long arms (36) and a couple of short arms (36) making a link mechanism. In the link mechanism made by said arms (36), one end of a couple of long arms (36) are jointed to the tail stock (20) and the other end of another couple of long arms (36) are jointed with the housing (50). One end of the short arms (36) whose another end is jointed with a couple of long arms (36) is connected to the cross head (35). As this link mechanism is of a known technique, further description will be omitted.

Then, the product removal equipment (S) will be described. The servo motor (45) of the product removal equipment (S) is mounted on the movable die plate (18), and in this embodiment, a product removing arm (47) is mounted on the servo motor (45) via an actuator (46). An absorption pad (48) is equipped at the end portion of the product removing arm (47). A pulse generator (45a) is mounted at the rear end of the servo motor (45) on control the rotation angle and angular velocity of the servo motor (45).

Now, because the reciprocating operation distance of the actuator (46) that operates for removing the molding (26) is short, the cylinder is sufficient for use of the actuator (46), but it is possible to use a servo motor instead of the cylinder. When a servo motor is used, the removal timing can be completely coincided, and loss time can be zeroed, but when a cylinder is used, the responsibility is inferior to that of the servo motor, and slight loss time may be generated. However, since its operating distance is short enough, the performance of the equipment is not impaired.

Numeral (9) is a controller, which controls the overall electrically-operated injection molding machine (A), and for some of the functions, it receives signals from the pressure sensor (15) for injection, pressure sensor (7) for resin pressure detection, pulse generators (11a), (12a), (31a), (40a), (45a), and (51a) mounted on servo motors (11), (12), (31), (40), (45), and (51) and others, and carries out control of servo motors (11), (12), (31), (40), (45), and (51) and others. Because the control of the driving system is all carried out by servo motors, optional conditions such as compounded operations can be created by programming.

Numeral (9) is an I/O unit to the controller (8) or CRT.

Now, the operation of this invention will be described. When the material resin (3c) is charged into a material feeder hopper (16) and the rotation servo motor (11) is operated to rotate the screw (4), the material resin (3c) is gradually fed into the injection cylinder (13). After that, because the injection cylinder (13) is heated with the heater (14) wrapped around its outer circumference, the material resin (3c) that has entered the injection cylinder (13) is gradually melted and is blended by the rotating operation of the screw (4).

With the rotation of the screw (4), the molten blended resin (3b) is fed to the top end direction of the injection cylinder (13) and stored at the top end portion. For this reaction, the screw (4) gradually reverses and eventually reaches the predetermined reverse stop position. At this point, the resin weighing is completed.

On the other hand, on the dies (1), as shown in FIG. 2, die clamping first takes place. That is, the dies control servo motor (31) is operated, the rotation force is transmitted to the driven pulley (34) via the driving pulley (32) and the timing belt (33). The driven pulley (34) is rotated to advance the cross head driving shaft (34a) screwed down to the driven pulley (34) in the right direction in the drawing FIG. 2, which, in turn, propels the cross head (35), and the dies opening and closing toggle (T) is stretched by the cross head. In this process, the movable die (1b) equipped to the movable die plate (18) moves in the direction of the stationary die (1a) and the movable die (1b) is pressed to the stationary die (1a) with a specified pressure by said toggle (T). Die clamping takes place in this manner.

Next, under this die clamping condition, the screw (4) is moved toward the dies (1) by the injection servo motor (12). The weighed and blended molten resin (3a) stored at the top end portion of the injection cylinder (13) is injected into the die cavity (2). The injection speed is controlled to an optimum by the controller (8). After the weighed molten resin (3b) is injected and filled inside the die cavity (2), gate cut is carried out successively.

After the gate cutting, the servo motor (40) for rotating the driving pulley (41) works the driven pulley (43) via the timing belt (42) while dies clamping is underway. As the screw shaft (30a) is screwed down to the nut portion (43a) of the driven pulley (43), the screw shaft (30a) and the hollow gate cutting bar (30b) connected to the top end of the screw shaft (30a) advances in the direction of the gate (1c) made in the stationary die (1a). By this gate cutting, the die cavity (2) is completely isolated from the outside.

Figure 3:
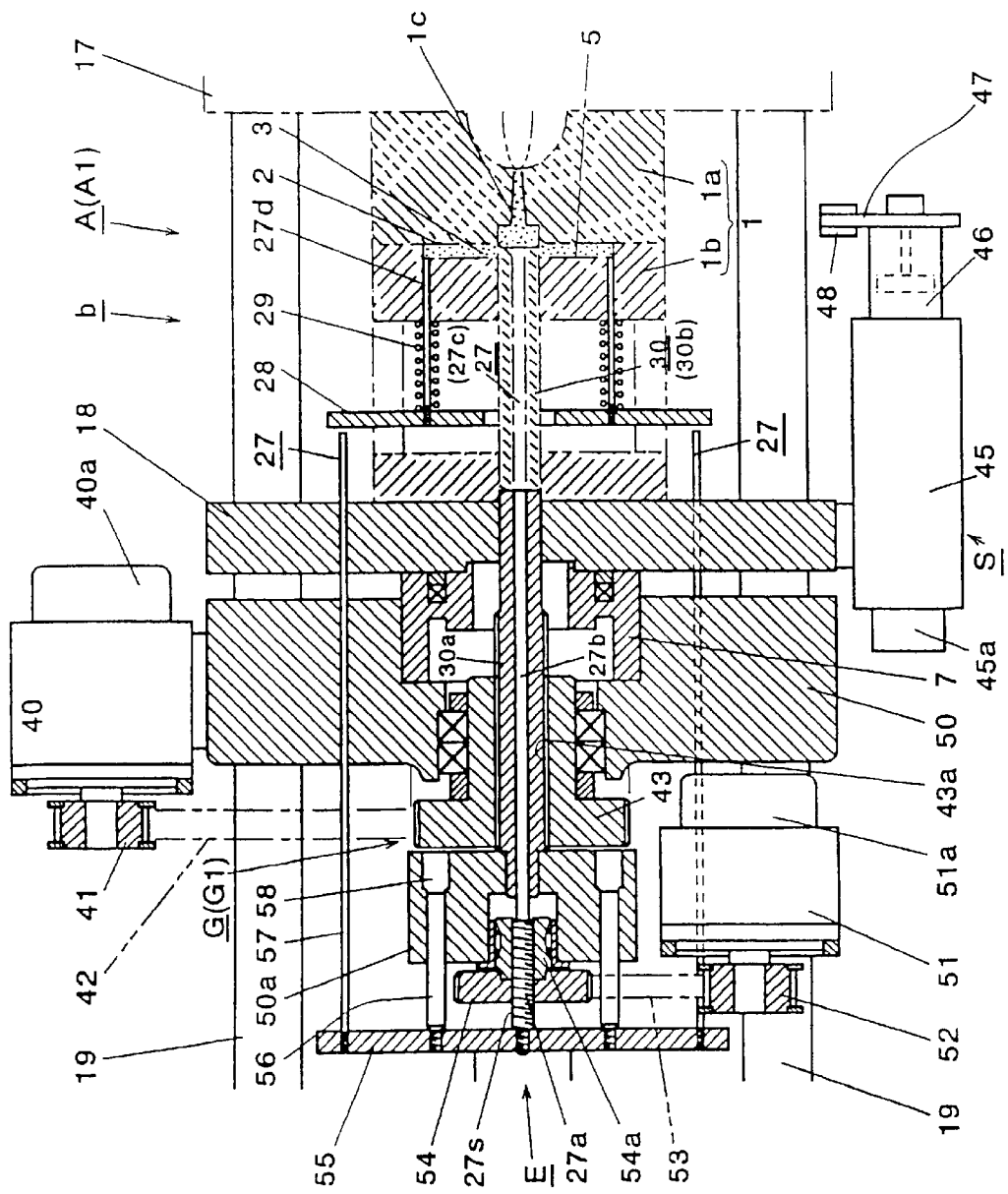
FIG. 3 is an enlarged cross-sectional view of the condition when resin is being filled in the dies in the die mechanism portion of FIG. 2.

When gate cutting is finished as described above, the die clamping condition is held or further tightened under this condition to press the filled resin (3) solidifing in the cavity (2) with extremely strong force, transferring micro-fine protrusions and recessions formed on the inner surface (5) of the die cavity (2) (see FIG. 3).

When solidification of filled resin (3) is finished by cooling, the servo motor (31) is reversed, the toggle mechanism (T) is loosened, and the movable die (1b) is separated from the stationary die (1a). In this process, the molding (26) is moved with the movable die (1b) as-fitted in the die cavity (2) of the movable die (1b) (see FIG. 4).

Lastly, when die opening is finished, the ejection servo motor (51) is operated, the driving pulley (52) is rotated by the ejection servo motor(51), and the driven pulley (54) is rotated by the driving pulley (52) via the timing belt (53). By this operation, the center ejection bar (27a) screwed down in the-nut portion (54a) of the driven pulley (54) advances together with the eject coupling bar (55) mounted on the end of the screwed portion (27s).

Figure 5:
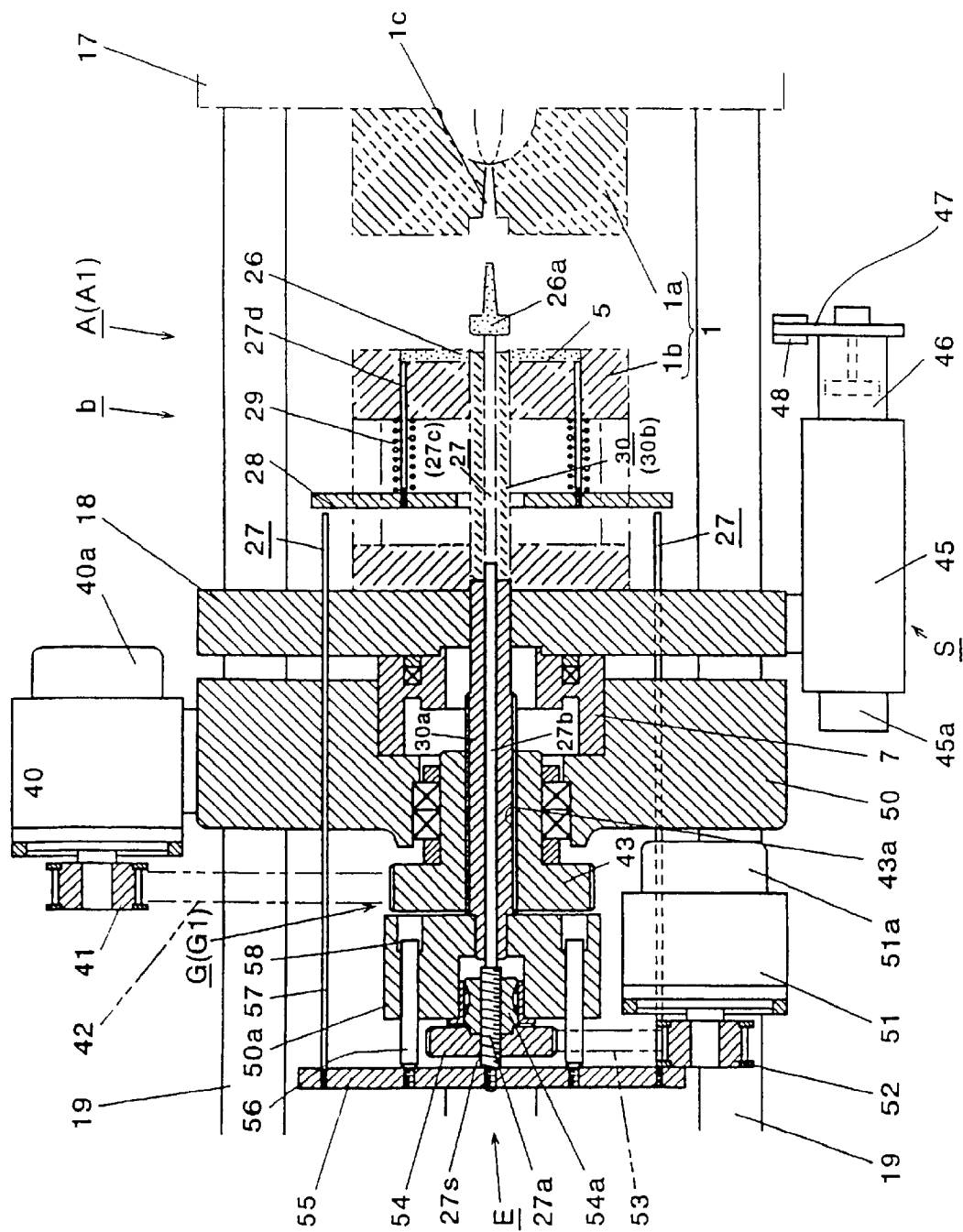
FIG. 5 is an enlarged cross-sectional view when the gate portion is ejected in the die mechanism portion of FIG. 2.
Figure 6:
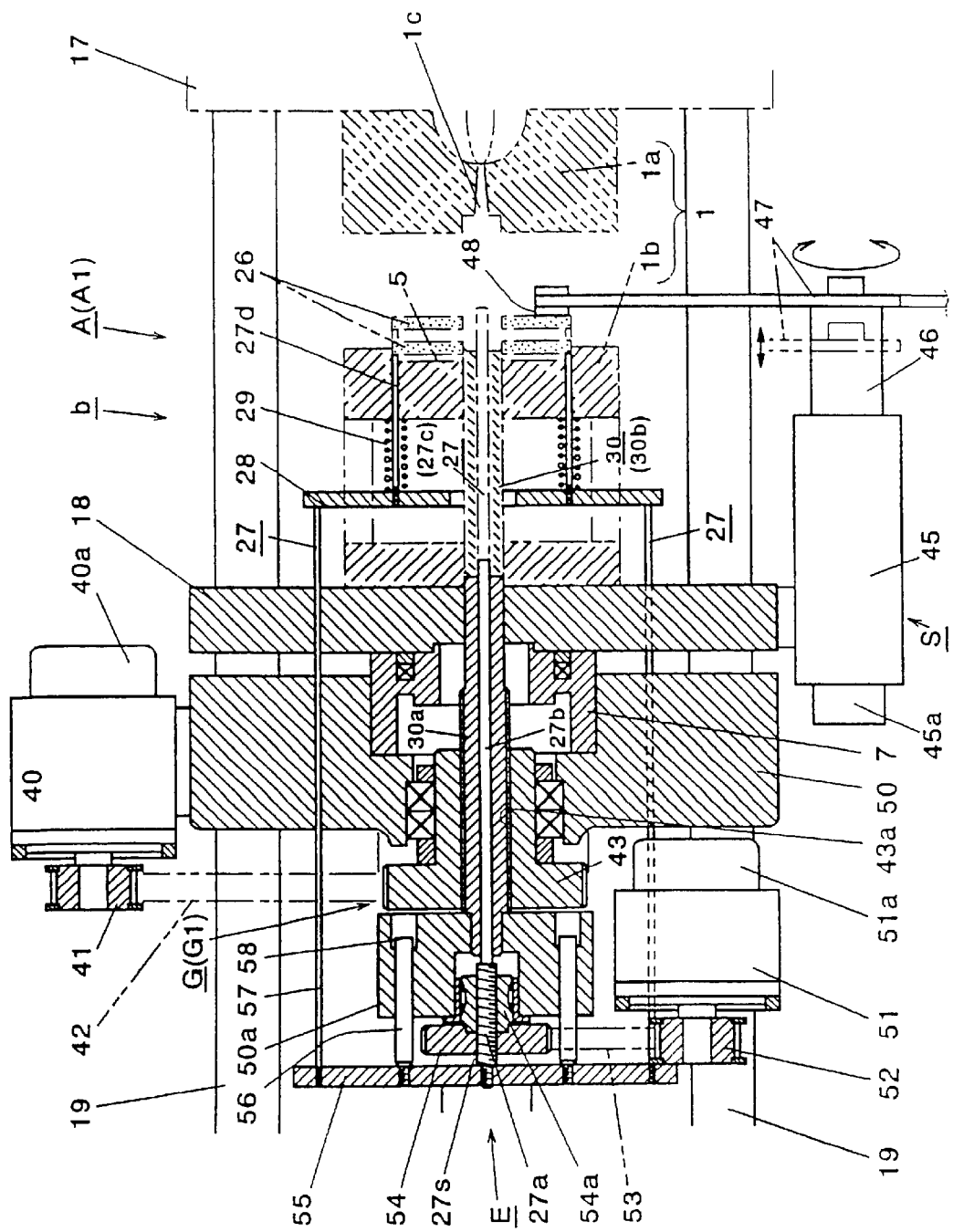
FIG. 6 is an enlarged cross-sectional view when the molding is ejected in the die mechanism portion of FIG. 2.
Figure 7:
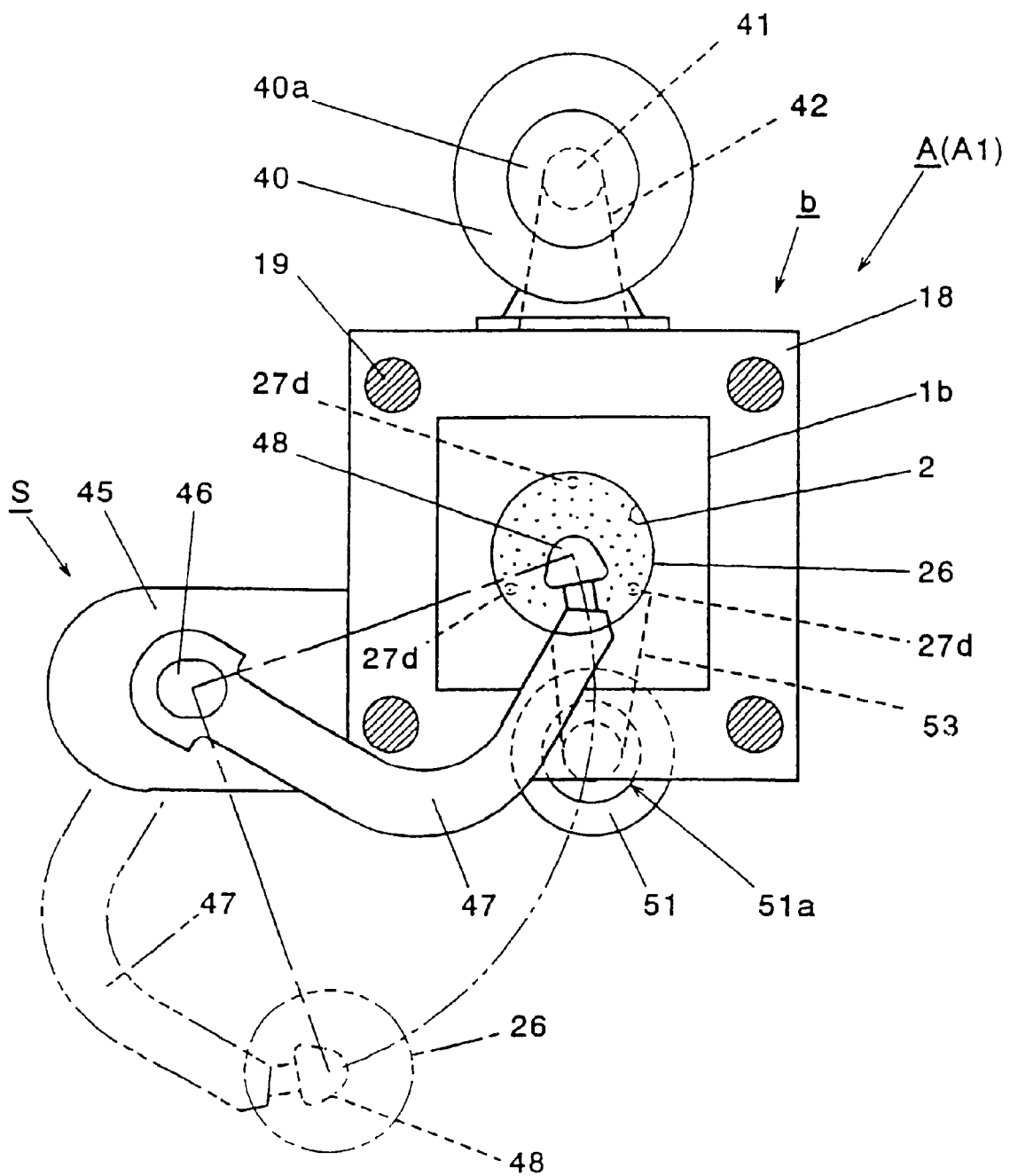
FIG. 7 is an enlarged cross sectional view taken on the line X—X of FIG. 2.

Prior to the contact of the product ejection operating bar (57) to the coupling bar (28) fixed to the product ejecting pins (27d), the center pin (27c) connected to the screw shaft (30a) projects and drops the gate portion (26a) adhering to the top end of the center pin (27c) together with the molding (26) (see FIG. 5).

After the dropping of said gate portion (26a), the servo motor (51) further continues to operate this process, the product ejection operating bar (57) is then advanced more to press the coupling bar (28) fixed to the product ejection pins (27d). When the product ejecting pins (27d) slightly project from the inner surface (5) of the die cavity (2), they press on the outer circumferential edge of the molding (26) where is the super fine protrusions and recessions non-molded portion (see FIG. 6).

And with the timing of the separation sound, the product removing equipment (S) is operated. That is, because ejection of the molding (26) is carried out by the ejection servo motor (51), the reproducibility of the timing has an extremely high accuracy. And because the operation of the servo motor (51) is inputted successively to the controller (8), the servo motor (45) of the product removing equipment (S) can be operated in step with the operation of the servo motor (51).

When the servo motor (45) is operated in step with the operation of the servo motor (51), the arm (47) which is waiting outside the dies (1) is rotated by a certain angle to insert the tip end portion having the absorption pad (48) inside the parting surface of the dies (1) and stopped in front of the molding (26), and then, the actuator (46) is operated to move the absorption pad (48) of the arm (47) indirection of the molding (26) and absorbs the molding (26) at the moment, when the molding (26) is ejected. And then, the actuator (46) is reversely operated to remove the molding (26) from the die cavity (2), and finally the servo motor (45) is reversely operated to take out the molding (26) to the outside of the dies (1).

This series of operation takes place in 0.12 to 0.15 second, and the loss time in a series of operations from the beginning of ejection to the product removal becomes the minimum, contributing to the improvement in increased cycles.

To describe the operation of pressure sensors (7) and (15), because the pressure sensor (7) is mounted between the movable die plate (18) and the housing (5), the die clamping force at the time of die clamping by the toggle mechanism (T) is directly applied to the pressure sensor (7), enabling the direct detection of the die clamping force.

Similarly, because the pressure sensor (15) is placed in the drive mechanism portion (10), weighing resin pressure and injection pressure applied to the screw (4) can be directly detected by the pressure sensor (15).

Referring now to FIG. 8 through 10, the second embodiment (A2) of this invention will be described in detail. The points overlapping with the first embodiment (A1) will be omitted to avoid complexity. The injection mechanism portion (a) of the second embodiment (A2) is the same as that of the first embodiment (A1), and the description will be omitted.

Because the die mechanism portion (b2) of the second embodiment (A2) slightly differs from the first embodiment (A1), the difference will be preferentially described. In this die mechanism portion (b2), the molding eject mechanism (E) is installed at the center of the rear surface of the housing (50) (that is, opposite side of the movable die (1b)), and this second embodiment (A2) is characterized with the points, or guide hole (38) drilled in the housing (50), a penetration hole (7a) drilled at the center of the pressure sensor (7), a through hole (22) drilled into the movable die plate (18), and an eject hole (23) drilled in the movable die (1b).

In this case, gate cutting is not carried out, but gate cutting may be enabled by varying the length between the straight portion (27b) and the guide bar (37).

The toggle driving screw (25) is movably equipped by screwing with the driven pulley (34) via a toggle driving nut (24) mounted in the tail stock (20), and the end of the toggle driving screw (25) is connected to the cross head (35) operating the dies opening and closing.

Next description will be made on the molding eject mechanism (E) formed inside the housing (50). The rotation driving nut (21) is placed in the housing (50) via the bearing, and the driven pulley (43) is fixed to the end of this rotation driving nut (21). The screwed portion (27s) of the center ejection bar (27a) is screwed down free of screw-advancing and screw-reversing to this rotation driving nut (21).

A coupling plate (39) is mounted on the end of the screwed portion (27s) of the center ejection bar (27a), and fixed with a nut. A guide bars (37) that form parts of the ejection member (27) are mounted on the circumferential edge of this coupling plate (39), and are slidably placed to the guide hole (38) drilled in the housing (50), a penetration hole (7a) drilled in the circumferential portion of the pressure sensor (7), a through hole (22) drilled in the circumferential portion of the movable die plate (18), and an eject hole (23) drilled around of the through hole (22) in the movable die (1b).

The description of toggle mechanism (T) for the dies opening and closing and the controller (8) will be omitted because they are the same as those of the first embodiment (A1).

Next description will be made on the operation of the second embodiment (A2). The operation from when material resin (3c) is charged into the material feeder hopper (16) to when resin weighing is finished is the same as that of the first embodiment (A1).

While resin (3a) is being weighed, die clamping is taking place as shown in FIG. 8 on the dies (1) side. As the die clamping operation is the same as that of the first embodiment (A1), the description of the die clamping operation will be omitted.

When die clamping and resin weighing are finished, the injection servo motor (12) is operated and the weighed and blended molten resin (3a) is injected into the die cavity (2). The injection speed is optimally controlled by the controller (8). When the weighed molten resin (3b) is injected and filled inside the die cavity (2), holding pressure takes place successively. During this period, the filled resin (3) is pressed with extremely strong pressure and super-fine protrusions and recessions formed on the inner surface (5) of the die cavity (2) on the movable die (1b) are transferred to the solidifying filled resin (3).

When solidification of the filled resin (3) in the die cavity (2) by cooling process is finished, the servo motor (31) is reversely operated to untighten the toggle mechanism (T). It causes that the movable die (1b) is separated from the stationary die (1a). In this process, the molding (26) moves together with the movable die (1b) as-fitted into the die cavity (2) of the movable die (1b).

When die opening is finished, operating the servo motor (40) rotates the rotation driving nut (21) and the screwed portion (27s) of the center ejection bar (27a) screwed down to the rotation driving nut (21) advances in step with the rotation of the rotation driving nut (21). At the same time, the guide bars (37) advance simultaneously because it is connected to the center ejection bar (27a) via the coupling plate (39).

The guide bars (37) and the center ejection bar (27a) which have advanced plunge out from the cavity (2) of the movable die (1b) and eject the molding (26) held in the cavity (2) to the outside of the cavity (2). In this case, as with the case of the first embodiment (A1), the molding (26) may be slightly floated from the inner surface (5) of the die cavity (2) using compressed air.

The product removal by the product removing equipment (S) is same as that of the first embodiment (A1) and the description will be omitted.

Referring now to FIGS. 11 through 15, the third embodiment (A3) of this invention will be described in detail. In this case, too, points overlapping with the first embodiment (A1) will be omitted to avoid complexity. The injection mechanism portion (a) of the third embodiment (A3) is the same as that of the first embodiment (A1) and the description will be omitted.

The dies mechanism portion (b) of the third embodiment (A3) is basically same as the description of the first embodiment (A1), but the third embodiment (A3) is characterized by carrying out gate cutting and molding ejection by one piece of servo motor (40), and this portion will be described in detail hereinafter.

First of all, the gate cutting screw mechanism (G) and the ejection screw mechanism (E) formed inside the housing (50) will be described. A rotating housing (501) is placed via a bearing inside the housing (50). A driven pulley (43) is fixed to the protrusion end of this rotating housing (501). A gate cutting drive nut portion (44) is fixed inside the hollow portion (502) of the rotating housing (501). A screw shaft (30a) is screwed down to this gate cutting drive nut portion (44), and is advanced and reversed by the rotation of the gate cutting drive nut portion (44). A screw shaft (30a) is screwed down in the center of the said nut portion (44), and is forwarded and reversed in concert with the normal and reverse rotation of the driven pulley (43) via said nut portion (44). A hollow gate cutting bar (30b) is placed in the movable die (1b) connected to this screw shaft (30a). A center pin (27c) connected to a straight portion (27b) is slidably placed inside this hollow gate cutting bar (30b).

The driven pulley (43) is connected to the driving pulley (41) of the servo motor (40) via the timing belt (42), and the gate cutting member (30) is operated by the servo motor (40). Now, the gate cutting member (30) comprises a screw shaft (30a) and a hollow gate cutting bar (30b) equipped to the top end the said shaft (30a). Numeral (40a) is a pulse generator equipped to the servo motor (40).

To describe the ejection screw mechanism (E) of the third embodiment (A3), a straight portion (27b) of the ejection bar (27a) is rotatably and slidably inserted in the screw shaft (30a). The screwed portion (27s) of the center ejection bar (27a) is screwed down to the eject nut portion (49) mounted on the inside of the protruded end of the rotating housing (501). Consequently, the ejection member (27) comprises the screwed portion (27s) and the straight portion (27b) and the center pin (27c) in the construction according to this embodiment.

A coupling plate (39) is mounted at the end portion of the screwed potion (27s) and fixed with a nut. Guide bars (37) are mounted at both ends of this coupling plate (39), and slidably inserted into the guide holes (38) drilled in the housing (50) respectively.

In projecting the molding (26) as discussed later, first of all, the gate portion (26a) attached to the top end of the center pin (27c) is dropped first, and then, the molding (26) is separated from the movable die (1b).

The toggle mechanism (T) for the dies opening and closing, product removal equipment (S), and controller (8) of the third embodiment (A3) are same as those of the first embodiment (A1) and the description is omitted.

Now, description will be made on the operation of the third embodiment (A3). The operations from charging material resin (3c) to the material feeder hopper (16) to injecting and filling the weighed molten resin (3b) into the die cavity (2) are same as those of the first embodiment (A1) and the description is omitted, but the gate-cutting operation which is carried out after these operations is original in this third embodiment (A3) and will be described in detail.

That is, after the resin is filled, operating the servo motor (40) during the dies (1) being clamped rotates the driving pulley (41) which rotates the driven pulley (43) via the timing belt (42). Because this driven pulley (43) is screwed down to the screw shaft (30a) via the rotating housing (501) and gate cutting drive nut portion (44), the screw shaft (30a) advances by the rotation of the driven pulley (43) and projects the hollow gate cutting bar (30b) connected to this towards the gate (1c) to cut the gate.

On the other hand, because the screwed portion (27s) of the center ejection bar (27a) is screwed down to the eject nut portion (49), rotating the driven pulley (43) rotates the eject nut portion (49). Rotating the eject nut portion (49) moves the center ejection bar (27a) toward the dies (1), as the screwed portion (27s) of the center ejection bar (27a) is screwed down to the eject nut portion (49). While the screwed portion (27s) of the center ejection bar (27a) and the screw shaft (30a) are formed in reversed threads, the ejection member (27) reverses when the screw shaft (30a) advances as described above.

When gate cutting completes in this way, the die cavity (2) is completely isolated from the outside.

Figure 12:
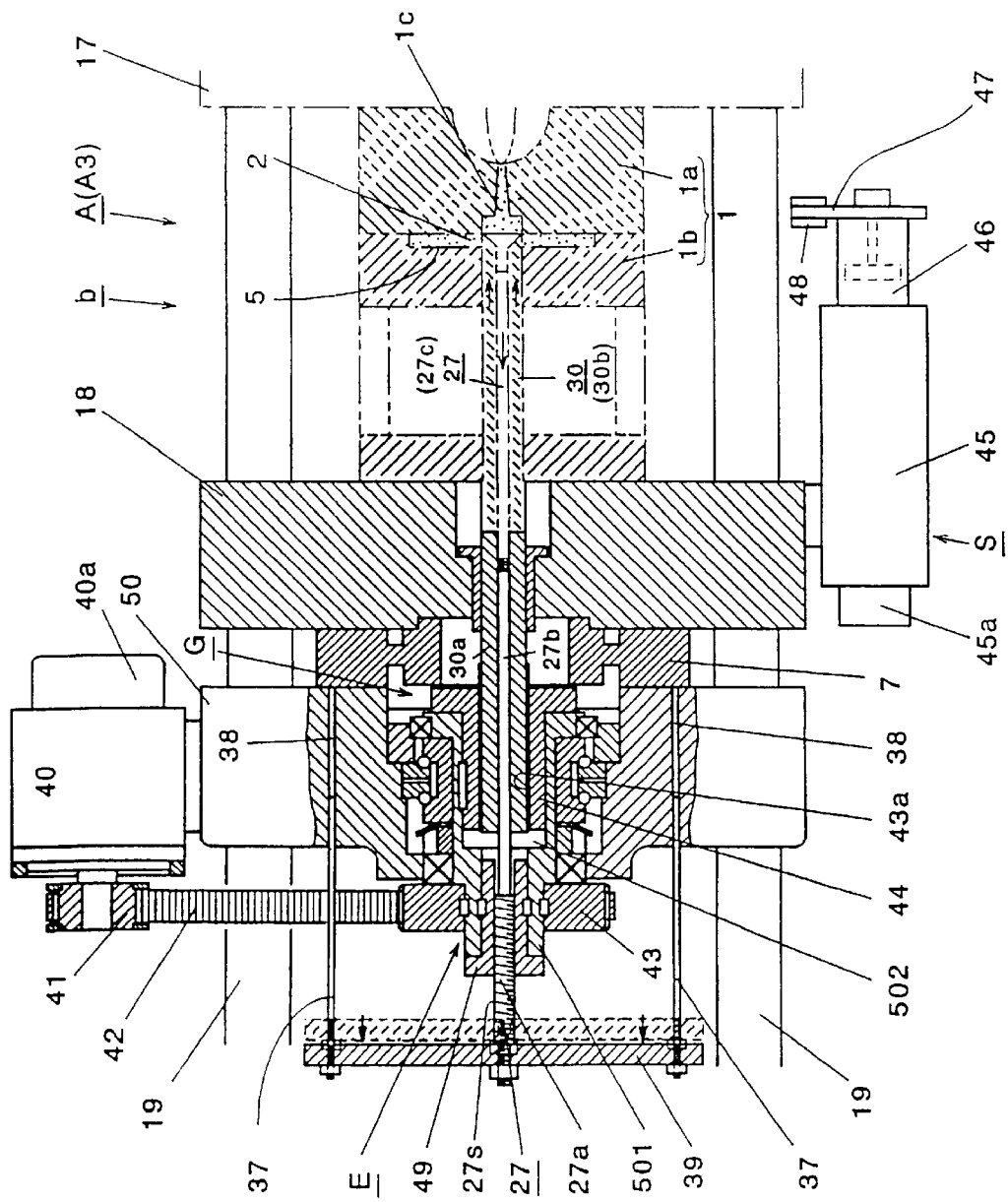
FIG. 12 is an enlarged cross-sectional view of the condition in which resin is being filled in the dies in the die mechanism portion of FIG. 11.
Figure 13:
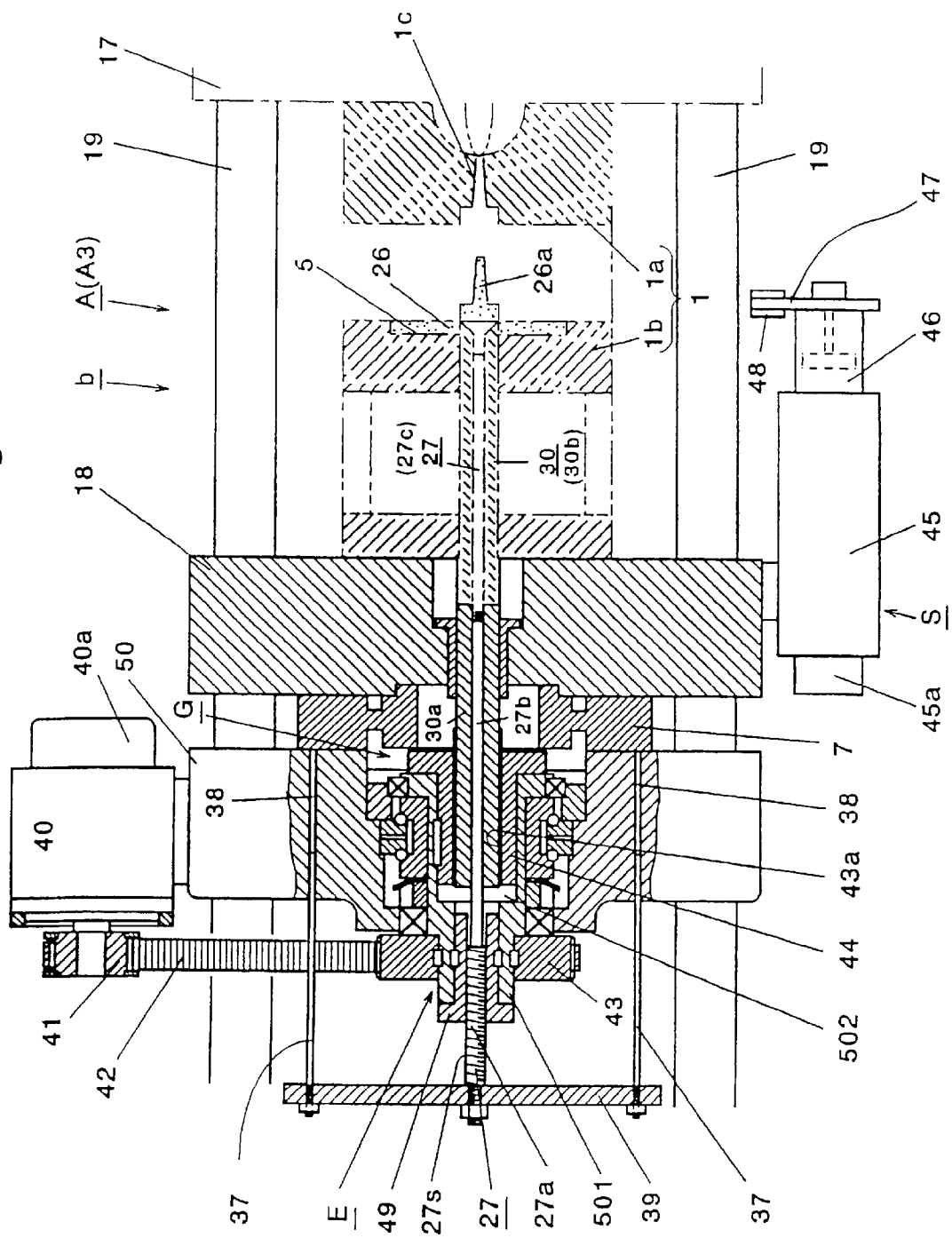
FIG. 13 is an enlarged cross-sectional view at the time of die opening in the die mechanism portion of FIG. 11.
Figure 14:
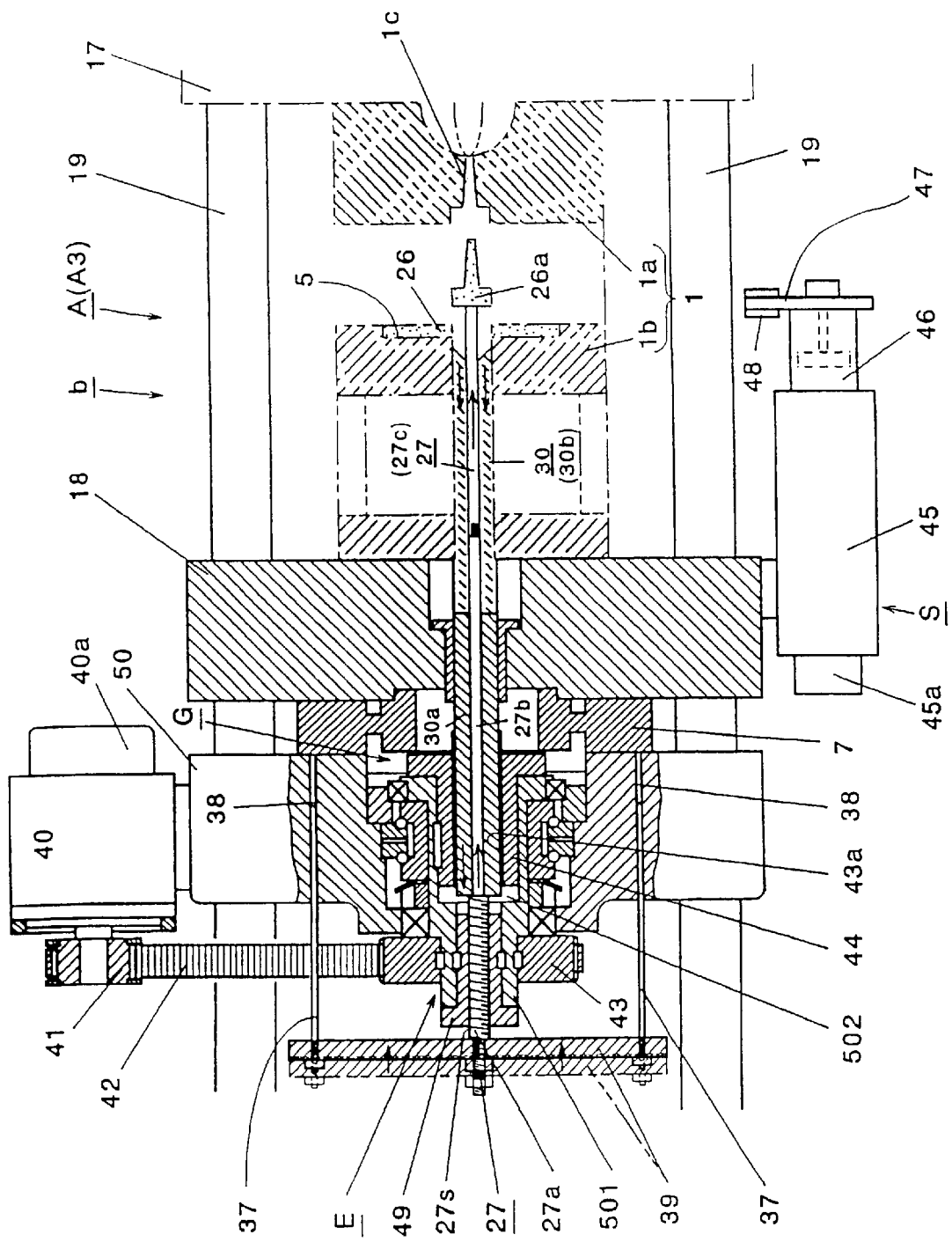
FIG. 14 is an enlarged cross-sectional view when the gate portion is ejected in the die mechanism portion of FIG. 11.
Figure 15:
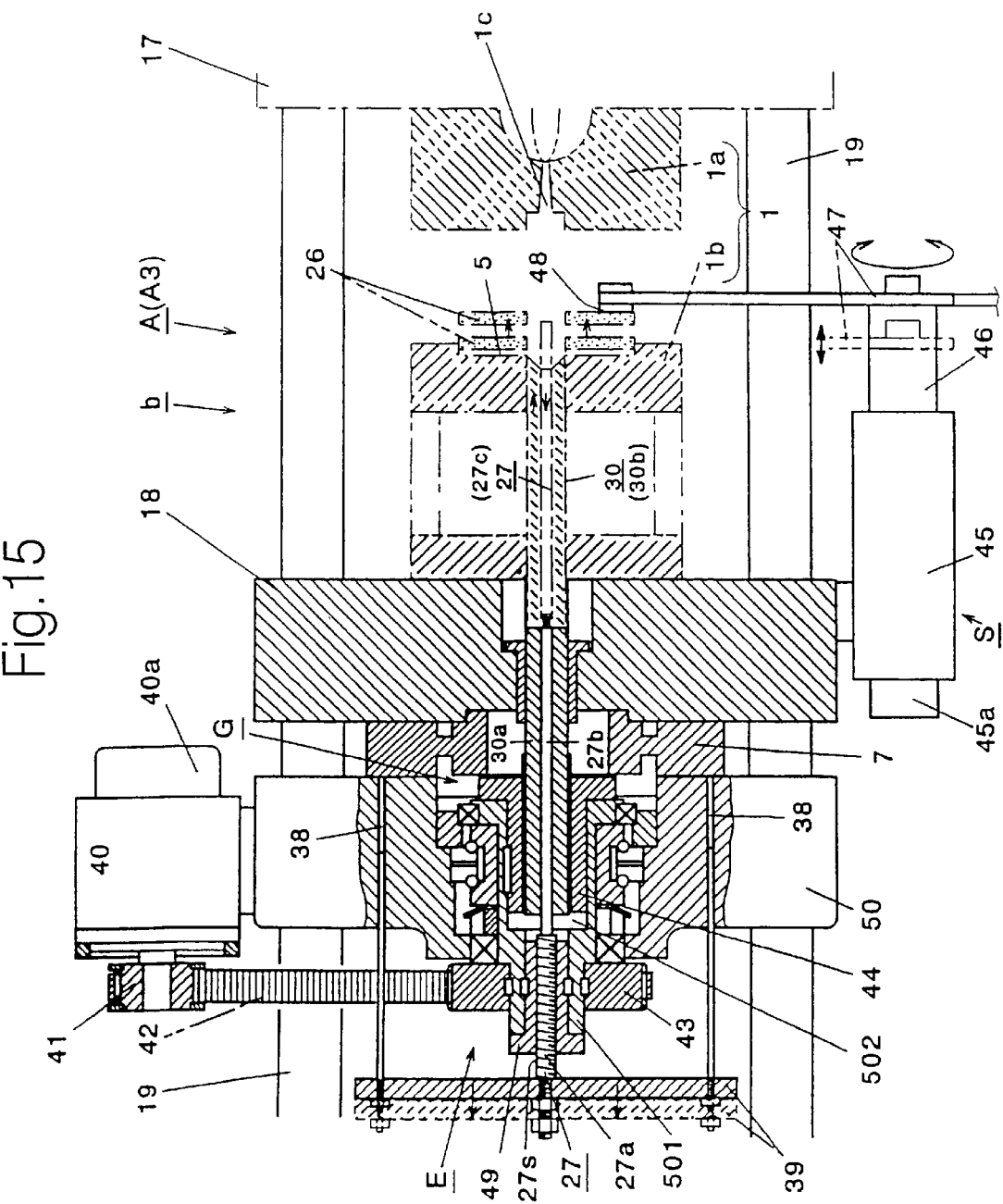
FIG. 15 is an enlarged cross-sectional view when product is removed in the die mechanism portion of FIG. 11.

When gate cutting is finished as described above, the die clamping condition is held under this condition or the die is further clamped to press the filled resin (3) with extremely strong pressure, and micro-fine protrusions and recessions formed on the inner surface (5) of the die cavity (2) in the movable die (1b) are transferred to the filled resin (3) under solidification (see FIG. 12).

The operations from the pressure-holding process to removal of the molding (26) are same as those of the first embodiment (A1), and the description will be omitted.

Referring now to FIG. 16 through FIG. 19, the fourth embodiment (A4) of this invention will be described in detail. In this case, points overlapping with the first embodiment (A1) will be omitted to avoid complexity. The injection mechanism portion (a) of the fourth embodiment (A4) is the same as that of the first embodiment (A1), and the description will be omitted. Because the fourth embodiment (A4) is characterized by the compression forming method of optical disk micro-fine protrusions and recessions formed inside the inner surface (5) of the die cavity (2) in the movable die (1b), the compression forming method will be preferentially described in this section.

The dies (1) of the dies mechanism portion (b) of the fourth embodiment (A4) slightly differ from the cases of the first through third embodiments (A1) through (A3). However, the dies mechanism portion (b) itself is basically same as that described in the first embodiment (A1), and the description will be omitted.

A core (5b) is formed at the parting surface of the stationary die (1a) of the fourth embodiment (A4), and a die cavity (2) that corresponds to the core (5b) is formed on the parting surface of the movable die (1b), and the core (5b) is fitted into the die cavity (2) when the dies(1) are closed.

In addition, for example, micro-fine protrusions and recessions for CD or DVD are formed on the surface (5) of the die cavity (2) opposite against to the core (5b) of the stationary die (1a). This surface (5) having micro-fine protruded and recessed require extremely high smoothness (for example, Max. 0.01 µm), flatness=0.1 µm, such as super mirror-surface processing, is required, and the parallelism such as 0.005 mm or less (there are common to all the embodiments).

In addition, a gate cutting member (30) is slidably disposed in the center of the movable die (1b).

The toggle mechanism (T) for the dies opening and closing is the same as that of the first embodiment (A1), and the description is omitted.

Now, the description is made on the gate cutting/ejecting mechanism portion (c) of the fourth embodiment (A4) equipped to the housing (50).

This gate cutting/ejecting mechanism portion (c) is designed to carry out gate cutting and ejection with one mechanism, but as with the case of the first embodiment (A1), the mechanism may be divided and equipped, respectively, or as with the case of the third embodiment (A3), gate cutting and ejecting may be carried out by the use of inverse threads.

The servo motor (40) for gate cutting and ejecting is mounted on the housing (50). The driving pulley (41) equipped to the rotation driving shaft of the servo motor (40) and the driven pulley (43) rotatably held to the housing (50) via the bearing are connected with the timing belt (42). The driving pulley (43) is mounted on the end of the operation nut (451), and an operation screwed portion (30a) screwed down to the latter half of the gate cutting member (30) is movably equipped by screwing to this operation nut (451).

The controller (8) is the same as that of the first embodiment (A1), the description will be omitted.

Now, FIG. 18 will be described. The relevant graph compares the compression molding method (first method) utilizing the electrically-operated injection molding machine (A) according to this invention and the injection molding method by the conventional hydraulic injection molding machine, with pressure as ordinate and time as abscissa. Curves shown with the solid line indicate the first control example of the compression molding method according to this invention, and the solid line on the upper side is a set pressure of the movable die (1b) and that on the lower side indicates the actual reaction force of the movable die (1b) detected with the pressure sensor (7).

Curves shown with the broken line indicate the conventional example, and the broken line on the upper side is a set pressure of the movable die by the hydraulic drive and that on the lower side are outputs of hydraulic sensors (not illustrated) installed to the hydraulic circuit.

In the conventional example, hydraulic drive is used for dies compression, and the compression pressure is detected with the hydraulic sensor installed to the hydraulic circuit, and it is controlled to coincide with the set pressure. However, in the case of hydraulic control, due to temperature changes of pressurized oil as well as various changes in viscosity, etc., or indirect detection of resin pressure detected via pressurized oil, or various factors such as difference between dynamic friction and static friction of the movable die, etc., the actual resin pressure inside the dies dynamically changes to show the wave form, and does not coincide with the set pressure. That is, the die compression pressure is set from the start of the injection process (0) to dies opening (R3) as shown in the broken line on the upper side and the compression pressure of the movable die should be hydraulically controlled to vary in accord with the set pressure, but in actuality, such condition does not occur. That is, the output from the hydraulic sensor equipped in the dies driving hydraulic circuit begins to be provided when injection begins, resin begins to be filled inside the die cavity, and the resin begins to come in contact with the movable die after a while. This point is shown with (s). Thereafter, as resin is filled, the output shown by the hydraulic sensor rapidly builds up and after it reaches the peak (S1), the output wave form of the resin pressure undulates due to the above-mentioned reasons. In other words, the resin pressure inside the die cavity dynamically changes, and does not coincide with the set pressure. In addition, there is a limit in the injection speed due to hydraulic drive, and resin is injected at a comparatively slow speed as shown in (0→R1) of FIG. 19. Consequently, a thin resin film is generated on the surface of the filled resin (3) and transferability is degraded.

The injection process is finished at point (R1), and the operation moves to the dies compression process (R1→R2), which is a pre-stage of the pressure holding process, but at this stage, pressure applied to each portion of filled resin is not uniform because of undulating pressure, and the internal stress of the molding increases, resulting in increased birefringence.

As against this, in this invention, since the resin pressure of the filled resin (3) is directly detected with the pressure sensor (7), it is possible to follow the compression pressure control in real time by the movable die (1b), the former half stage of the pressure-holding process, or the positional in real time by the movable die (1b), the latter half stage of the pressure-holding process. The injection speed can be controlled following the direct detection by the pressure sensor (7) within the range of the injection process (px→P1). Point (px) is an intersection between the vertical line (H1) drawn from the output initiation point of the pressure sensor (7) and the injection set speed curve (0→P1).

Next description will be made on the operation of the fourth embodiment (A4). The process from charging the material resin (3c) into the material feeder hopper (16) to completion of resin weighing is the same as that of the first embodiment (A1) and the description is omitted. The injection and filling process and pressure holding process thereafter will be discussed as follows.

The rotating speed of the screw (4) during this period (weighing process) is controlled by taking in output signals from the pulse generator (11a) into the controller (8), comparing them with the set value, and carrying out either feedback control or feed-forward control or a combination of both on the rotation servo motor (11) in such a manner to trace the set value. This point is common to all the embodiments (A1) through (A5).

Upon completion of resin weighing, the operation moves to the injection and filling process as described before, but when resin (3) is filled, the injection speed of the screw (4) is controlled by taking in output signals from the pressure sensor (15) into the controller (8), comparing them with the set value, and carrying out either feedback control or feed-forward control or a combination of both on the injection servo motor (12) in such a manner to trace the set value. This point is common to all the embodiments (A1) through (A5).

The dies compression molding operation (first method) of the dies (1) at the time of resin filling will be described later.

The rotating speed of the injection servo motor (12) is detected by the pulse generator (12a).

Since the injection speed is preferably controlled by the resin pressure of the filled resin (3) inside the die cavity (2) because it is direct, when the filled resin (3) comes in contact with the movable die (1b) at point (px) and data begins to be outputted from the pressure sensor (7) on the resin pressure, the injection speed control by the pressure sensor (15) may be switched to the injection speed control by the pressure sensor (7). This point is described referring to FIG. 19. Because (0→P1) region is the injection process, speed control is carried out, and in (0→px) of it, injection speed control by the pressure sensor (15) takes place, and in (px→P1) of it, the injection speed control by the pressure sensor (7) takes place. Needless to say, injection speed control by the pressure sensor (15) may be carried out throughout the whole (0→P1).

Because injection of weighed resin (3a) is carried out by the injection servo motor (12), high-speed injection extremely close to the setting volve is possible, and injection can be completed before thin resin film is formed on the filled resin (3) surface, and transferability can be remarkably improved.

Thereafter, gate cutting takes place at such timing (P1) that the gate cutting member (30) operates to cut the gate when the pressure sensor (7) indicates the specified value. Consequently, because gate cutting is carried out every time at the same resin pressure, the same amount of resin (3) is filled stably in the die cavity (2) every time.

Then, operation moves to the pressure-holding process [(P1)→(P3)]. The resin pressure inside the die cavity (2) is directly detected by the pressure sensor (7) for control in the pressure control region which is the former-half stage of the pressure-holding process. It is possible to provide the compression pressure nearly close to the setting to the filled resin (3) It makes the internal stress of the filled resin (3) enable further reduced.

When operation moves to the position control [(P2)→ (P3)] which is the latter-half stage of the pressure-holding process, filled resin (3) is nearly solidified, and the position of the movable die (1b) must be accurately controlled so that the thickness becomes uniform. As described above, because a given amount of resin (3) is filled in the die cavity (2) every time, if the detection value of the pressure sensor (7) is constant, the thickness becomes constant. Consequently, controlling the detection value of the pressure sensor (7) at the position control stage to the setting naturally brings the movable die (1b) position to a constant position, and the thickness of the molding (26) becomes constant.

Figure 4:
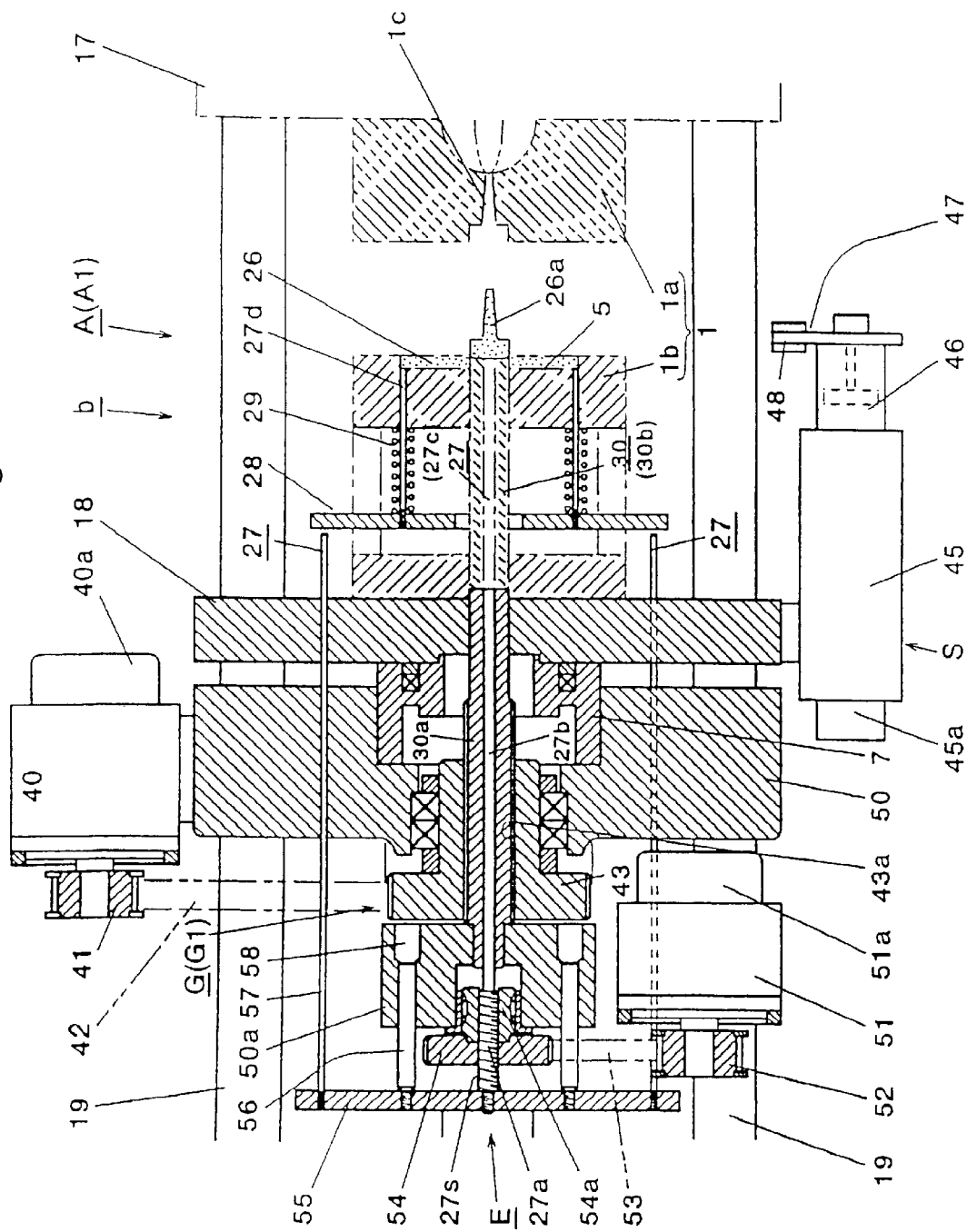
FIG. 4 is an enlarged cross-sectional view at the time of die opening in the die mechanism portion of FIG. 2.

The above process is described in terms of the movement of the dies (1). As shown in FIG. 4, first of all, when die clamping is carried out the core (5b) of the stationary die (1a) fits into the die cavity (2) of the movable die (1b). However, at this point, the toggle (T) is not completely extended, and a small clearance (t) is provided between parting faces. Consequently, the die cavity (2) becomes wider than that at the die clamping time.

Then, the injection servo motor (12) is worked for operating the screw mechanism portion (10), and the screw (4) is moved in the direction of the dies (1). The weighed and blended molten resin (3a) at the top end of the cylinder (13) is injected into the die cavity (2) (see FIG. 4). The injection speed is optimally controlled by the controller (8). The molten weighed resin (3a) is injected and filled in the die cavity (2). When the resin (3a) comes in contact with the die cavity (2) of the movable die (1b) and pressurizes the dies (1), the filling pressure is detected by the pressure sensor (7). In this process, as described above, because the die cavity (2) is set slightly wider, the molten blended resin (3b) is filled additionally in the amount equivalent to that.

The above processes (0→P1) is controlled by the pressure sensor (15), or (0→px) by the pressure sensor (15) and (px→P1) by the pressure sensor (7). Because this injection process is carried out in such a manner to follow the setting value by the injection servo motor (12), filling is finished before thin resin film is formed on the filled resin (3).

After that, gate cutting takes place, when the pressure sensor (7) indicates the specified value (P1), and feed of resin (3a) to the die cavity (2) is immediately stopped. (see FIG. 18 (3))

That is, operating the servo motor (40) to rotate the driven pulley (43) with the dies (1) clamping underway advances the gate cutting member (30), and blocks the gate(1c) of the stationary die (1a) at its top end. By this operation, the die cavity (2) is completely isolated from the outside with extra filled resin (3), which is equivalent to the portion (or position) the movable die (1b) did not advance.

Then, the die control servo motor (31) is operated again to further advance the cross head driving shaft (34a), and the cross head (35) is pressed to advance to further extend the toggle (T) so that the movable die plate (18) is pressed against the stationary die (1a) with a specified pressure. With this operation, the filled resin (3) is compressed with extremely strong pressure, and super-fine recessions and protrusions on the super-finely recessed and protruded inner surface (5) of the die cavity (2) are accurately transferred to the surface of the filled resin (3) that begins to solidify (see FIG. 18). Because the dies (1) are compressed while the resin pressure is directly detected with the pressure sensor (7), uniform die compression at high reproducibility can be carried out every time.

Now, after that this condition, the movable die (1b) is held so that the resin pressure achieves the specified value with directed by the pressure sensor (7), till the filled resin (3) becomes solid body solidifies. By this operation, the molding (26) with high reproducibility and uniform thickness (s) can be achieved every time.

Upon completion of solidification of the filled resin (3), the die control servo motor (31) is reversely worked to separate the movable die (1b) from the stationary die (1a) as shown in FIG. 18. In this event, the molding (26) moves together with the movable die (1b).

Lastly, the operation moves to FIG. 18, when the die opening by the servo motor (40) is finished to project the gate cutting member (30) from the die cavity (2), the molding (26) is separated from the movable dies (1) and recovered.

Now, the second procedure of the die compression molding method according to this invention will be described in detail, but this is an improvement of the first procedure described in the fourth embodiment (A4), and the operation is described referring to FIG. 20.

As shown in FIG. 20, the movable die (1b) moves toward the stationary die (1a), and the core of the stationary die (1a) fits into the die cavity (2) of the movable die (1b), after that, the dies (1) is clamped. However, at this point, the toggle (T) is not completely extended and a wider clearance (t) than that at the time of gate cutting in FIG. 20 is provided between cavity faces. clearance between cavity faces is shown with (T).

Under this condition, injection filling takes place, as shown in FIG. 20, the weighed resin (3a) is injection-filled while the movable die (1b) moves in the die closing direction from (T) to (t). In this event, the skin layer tries to be generated on the resin (3) surface from the moment of the injection, but since the movable die (1b) is moving in the die closing direction, the resin (3) flows in the inner surface (5) of the die cavity (2) of the movable die (1b) at higher speed, and the formation or growth of the skin layer is suppressed, and consequently, the generation of super-fine air pools is suppressed, and the resin (3) faithfully adheres to the inner surface (5) where super-fine recessions and protrusions are formed.

Successively, gate cutting takes place (see FIG. 20) at such timing (P1) that the gate cutting member (30) operates when the pressure sensor (7) indicates a specified value and protrudes from the movable die (1b) under traveling to carry out gate cutting, and shuts up the die cavity (2) from the gate (1c). The clearance between cavity surfaces of the movable die (1b) and the stationary die (1a) at this moment is (t).

Because gate cutting is carried out every time at the same resin pressure, the resin (3) of the same amount is stably filled in the die cavity (2) every time (however, since the width (t) is greater than the width (s) of the molding (26), the filled volume becomes greater than the volume of the molding (26)).

Because (t) is greater than the final thickness (S) of the molding (26), the resin (3) is filled in the die cavity (2) more than the volume of the molding (26).

Gate cutting is carried out by operating the servo motor (40) with the movable die (1b) under traveling for die clamping to rotate the driven pulley (43), and allowing the gate cutting member (30) to advance from the movable die (1b) under traveling, and blocking the gate (1c) of the stationary die (1a) at the top end, and the movable die (1b) is completely isolated from the outside with the resin (3) additionally filled.

The above process (0→P1) is controlled by the injection pressure sensor (15) or (0→px) is controlled by the injection pressure sensor (15) and (px→P1) controlled by the pressure sensor (7). This injection filling process is carried out in such a manner to follow the setting valve by the injection servo motor (12). In this case because the movable die (1b) is traveling during the resin (3) injected to the die cavity (2) the filled resin (3) increases the relative speed to the movable die (1b) in cooperation with the motion of the movable die (1b), and quickly flows in contact with the inner surface (5) of the die cavity (2) while constantly exposing the new inside resin to the surface. As a result, filling is finished before thin resin film is formed on the filled resin (3), and this hinders generation of super-fine air pools that impairs transferability. Consequently, super-fine recessions and protrusions formed on the die cavity (2) of side can be transferred to the molding (26) with remarkably excellent transferability.

Then, the operation moves from the pressure-holding process [(P1)→(P3)] to the removing process, but the pressure-holding process and removing process are same as those of the first procedure, and the description will be omitted.

The invention may be embodied in other specific forms without departing from the spirit or essential characteristics thereof. The present embodiments are therefore to be considered in all respects as illustrative and not restrictive, the scope of the invention being indicated by the appended claims than by the foregoing description and all changes which come within the meaning and range of equivalency of the claims are therefore intended to be embraced therein.

Effects

Effect [1] of the Invention

As described above, according to this invention, because all the injections operations are feedback controlled by the servo motors, the timing, injection speed, pressurizing speed, pressurizing pressure, and all others can be freely controlled, and as a result, the increased cycle can be enabled.

In particular, servo motors are used for driving sources of projection and removal of moldings after completion of molding, there is no variation in repetitive response accuracy of operation, and the loss time of product removal timing by the product removal equipment can be 0.01 second or less, enabling the achievement of the ultimate high cycle of operation.

Because the gate cutting screw mechanism and the ejection screw mechanism are arranged in line and the screw shaft of the ejection screw mechanism is inserted in the screw shaft of the gate cutting screw mechanism, the gate cutting screw mechanism and the ejection screw mechanism with complicated mechanism can be smoothly arranged in one place.

Effect [2] of the Invention

According to this invention, because the above-mentioned controls are carried out still more accurate control is enabled by direct detection of injection pressure, weighed resin pressure, and die clamping force by pressure sensors.

In particular, as installing a pressure sensor between the movable die plate, the housing and directly detecting the die clamping force actually applied to the dies, which has been assumed to be difficult, has been first enabled with this invention.

Effect [3] of the Invention

According to this invention, because all the motions of injection operations are controlled by servo motors, the timing, injection speed, pressurizing speed, pressurizing pressure, and all other factors can be freely controlled, and as a result, increased cycle can be achieved.

Because the feedback control in the above-mentioned controls is carried out still more accurate control is enabled by direct detection of injection pressure, weighed resin pressure, and die clamping force by pressure sensors.

In particular, as installing a pressure sensor between the movable die plate and the housing, directly detecting the die clamping force actually applied to the dies, which has been assumed to be difficult, has been made easy with this invention.

Effect [4] of the Invention

Because in this invention, pressure sensors are installed to detect reaction force of the die by filled resin in the die cavity and to control at least either one of injection process for filling resin in the die cavity or the subsequent pressure holding process based on the output data, or to carry out control of the whole or part of the above-mentioned processes, the data concerning the filled resin can be directly obtained from the pressure sensor, and each process can be accurately controlled real-time.

In addition, the timing control can be real-time and accurate by controlling the operation timing of the gate cutting member based on the output data from the pressure sensor.

It is also possible to carry out the above-mentioned control real-time and accurately by controlling the resin injection speed from the injection mechanism portion into the dies based on the output data from the pressure sensor.

Effect [5] of the Invention

Because the movable die is continuously moved to the die closing direction from the initiation of injection and filling of weighed resin to initiation of die clamping, the filled resin cooperates with the motion of the movable die, and in particular, it comes in contact with the inner surface of the die cavity on the movable die side and flows, and the formation of the skin layer on the resin surface is impeded. Consequently, when super-fine recessions and protrusions are formed on the inner surface of the die cavity on the movable die side, the transferability is remarkably improved with this method.

In addition, because the filled resin of the volume greater than the volume of the molding is filled in the die cavity for compression molding and the resin is compressed to the volume of the molding, the molding becomes a high-density substrate, and is free of variations in density, contributing to the improvement of quality.

What is claimed is:

1. A method of controlling a compression injection molding machine for performing precision molding, comprising:

mounting a movable die on a movable die plate;

moving the movable die plate and the mounted movable die with a toggle mechanism to form a die cavity;

filling the die cavity with resin;

providing a pressure sensor between said movable die plate and a housing supporting the toggle mechanism for detecting a reaction force on said movable die caused by the resin being filled in the die cavity and providing output data indicating the reactive force;

providing a gate cutting member for cutting a die gate; and controlling an operating timing of said gate cutting member based on the output data from said pressure sensor.

* * * * *